(12) United States Patent
Duan et al.

(10) Patent No.: US 11,836,341 B2
(45) Date of Patent: *Dec. 5, 2023

(54) SCROLLING SCREENSHOT METHOD AND ELECTRONIC DEVICE WITH SCREENSHOT EDITING INTERFACE

(71) Applicant: Huawei Technologies Co., Ltd., Shenzhen (CN)

(72) Inventors: Yun Duan, Wuhan (CN); Zhiyan Yang, Shenzhen (CN); Kai Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,852

(22) Filed: Nov. 29, 2022

(65) Prior Publication Data

US 2023/0088628 A1   Mar. 23, 2023

Related U.S. Application Data

(63) Continuation of application No. 17/263,703, filed as application No. PCT/CN2019/097062 on Jul. 22, 2019, now Pat. No. 11,531,461.

(30) Foreign Application Priority Data

Jul. 28, 2018   (CN) .......................... 201810850355.8

(51) Int. Cl.
    *G06F 3/0485*   (2022.01)
    *G06F 3/041*    (2006.01)
    (Continued)

(52) U.S. Cl.
    CPC .......... *G06F 3/0485* (2013.01); *G06F 3/0414* (2013.01); *G06F 3/0416* (2013.01); *G06F 3/04845* (2013.01); *G06F 3/04883* (2013.01)

(58) Field of Classification Search
    CPC .... G06F 1/1626; G06F 3/0414; G06F 3/0416; G06F 3/04845; G06F 3/0485;
    (Continued)

(56) References Cited

U.S. PATENT DOCUMENTS 9,405,442 B1     8/2016   Zhang et al.
10,649,864 B1 *  5/2020   Parikh ................ G06F 11/1438
(Continued)

FOREIGN PATENT DOCUMENTS

CN    105094617 A    11/2015
CN    105302429 A    2/2016
(Continued)

*Primary Examiner* — Richard J Hong
(74) *Attorney, Agent, or Firm* — Conley Rose, P.C.

(57) ABSTRACT

A method includes displaying, by an electronic device, a graphical user interface (GUI) of a first application on a touchscreen of the electronic device, detecting, by the electronic device, a screenshot operation from a user, taking, by the electronic device, a screenshot of the GUI in response to the screenshot operation, displaying, on the touchscreen, a first preview image corresponding to an obtained first screenshot, detecting, by the electronic device, a first touch operation on the first preview image, updating the first preview image to a second preview image in response to the first touch operation, and displaying the second preview image on the touchscreen.

20 Claims, 23 Drawing Sheets

(51) Int. Cl.
*G06F 3/04845* (2022.01)
*G06F 3/04883* (2022.01)

(58) Field of Classification Search
CPC ............ G06F 3/04883; G06F 3/04842; G06F 40/171; G06F 11/1438
See application file for complete search history.

(56) References Cited

U.S. PATENT DOCUMENTS

| | | |
|---|---|---|
| 2005/0235222 A1 | 10/2005 | Barbanson et al. |
| 2014/0189576 A1 | 7/2014 | Carmi |
| 2014/0289670 A1 | 9/2014 | Park et al. |
| 2015/0007024 A1 | 1/2015 | Jeong et al. |
| 2015/0128017 A1 | 5/2015 | Fithian et al. |
| 2015/0277571 A1* | 10/2015 | Landau ............... G06F 3/04842 715/863 |
| 2016/0179328 A1 | 6/2016 | Yang et al. |
| 2016/0266757 A1 | 9/2016 | Ye |
| 2018/0046341 A1 | 2/2018 | Lee et al. |
| 2019/0147026 A1* | 5/2019 | Jon ...................... G06F 40/171 715/230 |
| 2020/0012542 A1 | 1/2020 | Shapiro et al. |

FOREIGN PATENT DOCUMENTS

| | | |
|---|---|---|
| CN | 105892868 A | 8/2016 |
| CN | 106708359 A | 5/2017 |
| CN | 106775289 A | 5/2017 |
| CN | 108108217 A | 6/2018 |
| CN | 109271081 A | 1/2019 |

\* cited by examiner

SCROLLING SCREENSHOT METHOD AND ELECTRONIC DEVICE WITH SCREENSHOT EDITING INTERFACE

CROSS-REFERENCE TO RELATED APPLICATIONS

This is a continuation of U.S. patent application Ser. No. 17/263,703 filed on Jan. 27, 2021, which is a U.S. National Stage of International Patent Application No. PCT/CN2019/097062 filed on Jul. 22, 2019, which claims priority to Chinese Patent Application No. 201810850355.8 filed on Jul. 28, 2018. All of the aforementioned applications are hereby incorporated by reference in their entireties.

TECHNICAL FIELD

This application relates to the field of terminal technologies, and in particular, to a scrolling screenshot method and an electronic device.

BACKGROUND

In the prior art, a touchscreen 101 of an electronic device (for example, a mobile phone or a tablet computer) may display graphical user interfaces (GUI for short below) of various applications (App for short below). If a user needs to take a scrolling screenshot of a GUI currently displayed on the touchscreen 101, the user usually needs to first take a screenshot by using a preset gesture or by using a physical button, and then take a scrolling screenshot by tapping a scrolling screenshot control displayed on the touchscreen 101. Operations of the foregoing scrolling screenshot method are cumbersome, and consequently use efficiency of the electronic device is greatly reduced.

SUMMARY

To resolve the foregoing technical problem, this application provides a scrolling screenshot method and an electronic device, to improve use efficiency of the electronic device and also improve a capability of intelligent interaction between the electronic device and a user.

According to a first aspect, this application provides a scrolling screenshot method, the method may be implemented on an electronic device having a touchscreen, and the method may include: displaying a graphical user interface (GUI) of a first application on the touchscreen; detecting, by the electronic device, a screenshot operation performed by a user (for example, the user taps a control on the touchscreen 101); taking, by the electronic device, a screenshot of the GUI in response to the screenshot operation; displaying, on the touchscreen, a first preview image corresponding to an obtained first screenshot; detecting, by the electronic device, a first touch operation on the first preview image, where the first touch operation may be, for example, a downward swipe gesture made by a finger of the user on the first preview image; updating the first preview image to a second preview image in response to the first touch operation; and displaying the second preview image on the touchscreen. According to the technical solution in the foregoing embodiment, the electronic device may enable the user to take a scrolling screenshot by using a touch operation such as a swipe gesture on the preview image. This greatly improves scrolling screenshot efficiency of the electronic device, and also improves user experience.

In a possible implementation, the method further includes: detecting, by the electronic device, a second touch operation on the second preview image, where the second touch operation may be a touch and hold operation or a heavy press operation; displaying at least two controls on the touchscreen in response to the second touch operation, where the controls are used to perform different processing on a second screenshot corresponding to the second preview image; detecting, by the electronic device, a third touch operation on one of the controls; and sharing the second screenshot corresponding to the second preview image with a contact of a second application in response to the third touch operation. According to this implementation solution, the electronic device can help the user delete a scrolling screenshot, to improve processing efficiency of the scrolling screenshot.

In another possible implementation, the first preview image may be automatically updated based on a distance of the downward swipe gesture, and the updated first preview image (for example, the second preview image) is synchronously displayed. In this way, the electronic device can notify, by using a preview image or a GUI that is automatically updated on the touchscreen, the user of a real-time status of a scrolling screenshot when the user swipes in a scrolling screenshot gesture, to further guide the user to correctly take a screenshot, thereby improving scrolling screenshot efficiency of the electronic device, and further improving user experience.

In a possible implementation, the first preview image is a preview image of the first screenshot obtained by taking a screenshot of the displayed GUI, and the second preview image is a preview image of the second screenshot obtained by taking a scrolling screenshot of the first application.

In a possible implementation, the first touch operation is a downward swipe gesture on the first preview image; and the updating the first preview image to the second preview image in response to the first touch operation may specifically include: automatically updating, by the electronic device, the first preview image to the second preview image based on a swipe distance of the gesture.

In another possible implementation, the GUI of the first application is automatically updated and displayed when the first preview image is automatically updated to the second preview image. In this way, a display effect on the touchscreen may be used to notify the user of a scrolling screenshot process, to improve user experience.

In another possible implementation, the first screenshot corresponding to the first preview image is a screenshot of the currently displayed GUI, and the second screenshot corresponding to the second preview image not only includes the screenshot of the currently displayed GUI, but also includes a screenshot of content that is of the first application (for example, a weather application) and that is not displayed on the current GUI. Therefore, in terms of a display effect, a size of the first preview image may be less than a size of the second preview image. In this way, the user can easily identify whether a currently displayed preview image is a common screenshot or a scrolling screenshot. Certainly, in another possible implementation, although content of the first preview image is less than content of the second preview image, for uniform display effects, a size of the first preview image may alternatively be the same as a size of the second preview image.

According to a second aspect, an embodiment provides a scrolling screenshot method, the method may be implemented on an electronic device having a touchscreen, and the method includes: displaying a graphical user interface (GUI) of a first application on the touchscreen; detecting, by the electronic device, a screenshot operation; taking, by the electronic device, a screenshot of the GUI in response to the screenshot operation; displaying, by the electronic device in a first position of the touchscreen, a first preview image corresponding to an obtained first screenshot; detecting, by the electronic device, a first touch operation on the first preview image; and taking, by the electronic device, a scrolling screenshot of the GUI of the first application in response to the first touch operation. According to the technical solution in the foregoing embodiment, a gesture operation is performed on the first preview image, so that a scrolling screenshot can be taken very conveniently. In this way, efficiency of the electronic device is improved, and user experience is also improved.

In some possible implementations, the method may further include: displaying a second preview image on the touchscreen, where the second preview image is a preview image of a second screenshot corresponding to a scrolling screenshot.

In some other possible implementations, the first touch operation may be a downward swipe gesture on the first preview image; and the taking, by the electronic device, a scrolling screenshot of the GUI of the first application in response to the first touch operation may specifically include: automatically updating, by the electronic device, the displayed GUI of the first application on the touchscreen based on a swipe distance of the gesture.

In some possible implementations, the first preview image may be accordingly moved downward with swiping of the gesture with an unchanged size. In some possible implementations, the first preview image may be accordingly moved downward with swiping of the gesture, and the first preview image is automatically updated based on the swipe distance of the gesture.

In some possible implementations, when the gesture stops, the first preview image pops back and is displayed in the first position. In some other embodiments, when the gesture stops, the first preview image pops back and is displayed in the first position, the first preview image is automatically updated to the second preview image, and the second preview image is a preview image of the second screenshot captured based on the swipe distance of the gesture.

According to a third aspect, this application provides an electronic device, including a touchscreen, one or more processors, a memory, a plurality of applications, and one or more programs. The processor is coupled to the memory, and the one or more programs are stored in the memory. When the electronic device runs, the processor executes the one or more programs stored in the memory, so that the electronic device performs the scrolling screenshot method.

According to a fourth aspect, an embodiment of this application provides a computer readable storage medium. The computer readable storage medium stores an instruction. When the instruction is run on the terminal according to any one of the foregoing possible implementations, the terminal is enabled to perform the text selection method according to any one of the foregoing possible implementations.

According to a fifth aspect, an embodiment of this application provides a computer program product including an instruction. When the computer program product is run on the terminal according to any one of the foregoing possible implementations, the terminal is enabled to perform the text selection method according to any one of the foregoing implementations.

According to a sixth aspect, this application further provides a scrolling screenshot apparatus. The apparatus has a function of implementing behavior of the electronic device in the foregoing method implementations. The function may be implemented by hardware, or implemented by hardware executing corresponding software. The hardware or the software includes one or more modules corresponding to the foregoing function.

According to a seventh aspect, this application further provides a graphical user interface, the graphical user interface is stored in an electronic device, the electronic device includes a touchscreen, a memory, and one or more processors, the one or more processors are configured to execute one or more computer programs stored in the memory, and the graphical user interface includes: a first GUI of a first application that is displayed on the touchscreen; a first preview image that is displayed on the touchscreen and that is obtained by taking a screenshot of the first GUI in response to a screenshot operation performed by a user; a second preview image that is displayed and to which the first preview image is automatically updated in response to a touch operation on the first preview image, where a size of the first preview image is less than or equal to a size of the second preview image.

In a possible implementation, the touch operation is a downward swipe gesture, and that the first preview image is automatically updated to the second preview image specifically includes: the first preview image is automatically updated based on a swipe distance of the gesture and the second preview image is displayed.

In another possible implementation, the first GUI displayed on the touchscreen is automatically updated to a second GUI when the first preview image is automatically updated to the second preview image.

It should be understood that, in the specification, descriptions about technical features, technical solutions, advantages, or similar words do not imply that all characteristics and advantages can be implemented in any single embodiment. On the contrary, it can be understood that the descriptions about features or advantages mean that at least one embodiment includes particular technical features, technical solutions, or advantages. Therefore, in the specification, the descriptions about technical features, technical solutions, or advantages are not necessarily included in a same embodiment. In addition, technical features, technical solutions, and advantages described in the following embodiments may be further combined in any appropriate manner. A person skilled in the art understand that, an embodiment can be implemented without one or more particular technical features, technical solutions, or advantages in a particular embodiment. In other embodiments, additional technical features and advantages may further be identified in a specific embodiment that does not reflect all the embodiments.

DESCRIPTION OF EMBODIMENTS

Terms used in the following embodiments of this application are merely intended to describe specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any or all possible combinations of one or more associated listed items.

The following describes embodiments of an electronic device, a graphical user interface (which may be briefly referred to as GUI below) used for the electronic device, and a binding process using the electronic device. In some embodiments, the electronic device may be a portable electronic device that further includes other functions such as a personal digital assistant function and/or a music player function, for example, a mobile phone, a tablet computer, or a wearable electronic device having a wireless communication function (for example, a smartwatch). An example embodiment of the portable electronic device includes but is not limited to a portable electronic device using iOS®, Android®, Microsoft®, or another operating system. The portable electronic device may alternatively be another portable electronic device, for example, a laptop computer (Laptop) with a touch-sensitive surface (for example, a touch panel). It should be further understood that, in some other embodiments, the electronic device may alternatively not be a portable electronic device, but a desktop computer with a touch-sensitive surface (for example, a touch panel).

Figure 1:
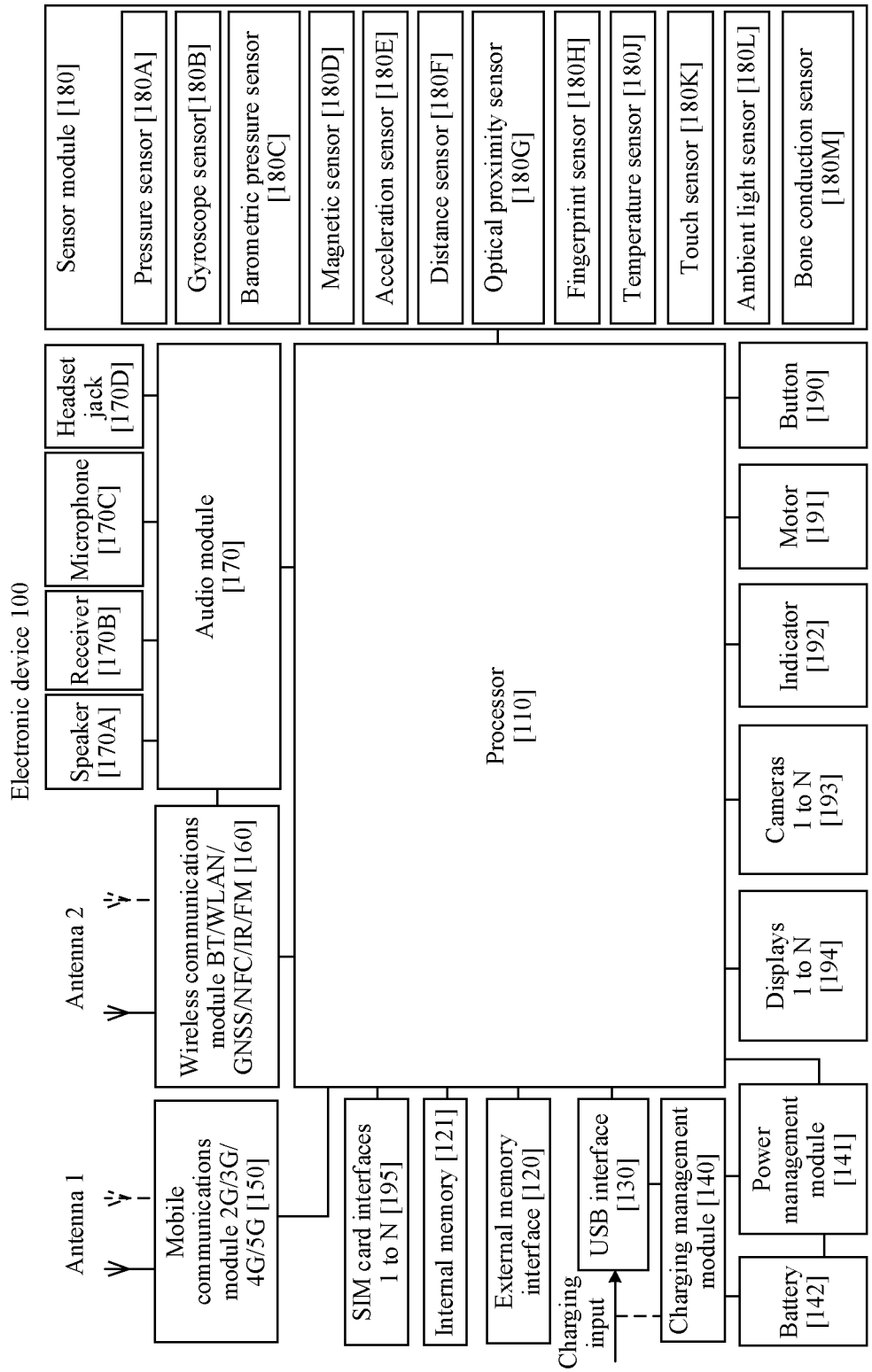
FIG. 1 is a schematic structural diagram of an electronic device 100 according to some embodiments.

FIG. 1 is a schematic structural diagram of an electronic device 100.

The electronic device 100 may include a processor 110, an external memory interface 120, an internal memory 121, a USB interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a SIM card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in FIG. 1 does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (Neural-network Processing Unit, NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is used for asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB type-C interface, or the like. The USB interface may be configured to connect to the charger to charge the electronic device 100, or may be configured to perform data transmission between the electronic device 100 and a peripheral device, or may be configured to connect to a headset to play audio by using the headset. The interface may be further configured to connect to another electronic device such as an AR device.

It may be understood that an interface connection relationship between the modules that is shown in the embodiments is merely an example for description, and does not constitute a limitation on the structure of the electronic device 100. In some other embodiments, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera module 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through an antenna module 1, an antenna module 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, a cellular network antenna may be multiplexed as a wireless local area network diversity antenna. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (Low Noise Amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution that is applied to the electronic device 100 and that includes a wireless local area network (wireless local area networks, WLAN), Bluetooth (Bluetooth, BT), a global navigation satellite system (global navigation satellite system, GNSS), frequency modulation (frequency modulation, FM), near field communication (near field communication, NFC), infrared (infrared, IR) technology, and the like. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function through the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs, which execute a program instruction to generate or change display information.

The display 194 is configured to display an image, a video, and the like. The display 194 includes a display panel. The display panel may be an LCD (liquid crystal display, liquid crystal display), an OLED (organic light-emitting diode, organic light-emitting diode), an active-matrix organic light-emitting diode or an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes, QLED), or the like. In some embodiments, the electronic device 100 may include one or N displays, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, a ray of light is transmitted to a light-sensitive element of a camera through a lens, and an optical signal is converted into an electrical signal. The light-sensitive element of the camera transmits the electrical signal to the ISP for processing, and converts the electrical signal into a visible image. The ISP may further optimize an algorithm for noise, luminance, and complexion of an image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the light-sensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal. In addition to the digital image signal, the digital signal processor may further process another digital signal. For example, when the electronic device 100 selects a frequency, the digital signal processor is configured to perform Fourier transform on frequency energy.

The video codec is configured to compress or decompress a digital video. The electronic device 100 may support one or more types of video codecs. In this way, the electronic device 100 may play or record videos in a plurality of coding formats, for example, MPEG1, MPEG2, MPEG3, and MPEG4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and a video are stored in the external memory card.

The internal memory 121 may be configured to store computer executable program code, and the executable program code includes an instruction. The processor 110 may run the foregoing instruction stored in the internal memory 121, to perform various function applications and data processing of the electronic device 100. The memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, and may further include a nonvolatile memory such as at least one disk storage device, a flash memory, or a universal flash storage (universal flash storage, UFS).

The electronic device 100 may implement an audio function such as music playing and recording through the audio module 170, the speaker 170A, the receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may be used to listen to music or answer a call in a hands-free mode through the speaker 170A.

The receiver 170B, also referred to as an "earpiece", is configured to convert an audio electrical signal into a sound signal. When a call is answered or audio information is listened to through the electronic device 100, the receiver 170B may be put close to a human ear to listen to a voice.

The microphone 170C, also referred to as a "mike" or a "voice transmitter", is configured to convert a sound signal into an electrical signal. When making a call or sending voice information, the user may make a sound near the microphone 170C through the mouth of the user, to input a sound signal to the microphone 170C. At least one microphone 170C may be disposed in the electronic device 100. In some other embodiments, two microphones may be disposed in the electronic device 100, to collect a sound signal and implement a noise reduction function. In some other embodiments, three, four, or more microphones may alternatively be disposed in the electronic device 100, to collect a sound signal, implement noise reduction, and identify a sound source, so as to implement a directional recording function, and the like.

The headset jack 170D is configured to connect to a wired headset. The headset jack may be a USB interface, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of a conductive material. When a force is applied to the pressure sensor 180A, capacitance between electrodes changes. The electronic device 100 determines pressure intensity based on the change of the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are applied to a same touch position but have different touch operation strength may correspond to different operation instructions. For example, when a touch operation whose touch operation intensity is less than a first pressure threshold is performed on a messages application icon, an instruction for viewing an SMS message is performed. When a touch operation whose touch operation intensity is greater than or equal to the first pressure threshold is performed on the messages application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip cover through the magnetic sensor 180D. In some embodiments, when the electronic device 100 is a clamshell phone, the electronic device 100 may detect opening and closing of a flip cover based on the magnetic sensor 180D, to set a feature such as automatic unlocking through flipping based on a detected opening or closing state of the flip cover or a detected opening or closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may be further configured to identify a posture of the electronic device, and is applied to an application such as switching between landscape orientation and portrait orientation or a pedometer.

The distance sensor 180F is configured to measure a distance. The electronic device 100 may measure the distance in an infrared or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector such as a photodiode. The light emitting diode may be an infrared light emitting diode. The electronic device 100 emits infrared light through the light emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, through the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light luminance. The electronic device 100 may adaptively adjust luminance of the display 194 based on the sensed ambient light luminance. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may implement fingerprint-based unlocking, application lock access, fingerprint-based photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally because of a low temperature. In some other embodiments, when the temperature is less than still another threshold, the electronic device 100 boosts an output voltage of the battery 142 to avoid abnormal shutdown caused by a low temperature.

The touch sensor 180K is also referred to as a touch panel or a touch-sensitive surface. The touch sensor 180K may be disposed on the display 194, and the touch sensor 180K and the display 194 constitute a touchscreen 101 (not shown in FIG. 1). The touch sensor 180K is configured to detect a touch operation on or near the touch sensor 180K. The touch sensor may transfer the detected touch operation to the application processor to determine a type of the touch event. A visual output related to the touch operation may be provided through the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may alternatively be disposed in the headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, which may be configured to indicate a charging status and a power change, or may be configured to indicate a message, a missed call, a notification, and the like.

The SIM card interface 195 is configured to be connected to a subscriber identity module (subscriber identity module, SIM). The SIM card may be inserted into the SIM card interface or detached from the SIM card interface, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into one SIM card interface at the same time. The plurality of cards may be of a same type or different types. The SIM card interface 195 may further be compatible with different types of SIM cards. The SIM card interface 195 may further be compatible with an external storage card. The electronic device 100 interacts with a network by using the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

The following embodiments may be all implemented on an electronic device 100 (for example, a mobile phone or a tablet computer) having the foregoing structure.

Figure 2A:
FIG. 2A and FIG. 2B are schematic diagrams of graphical user interfaces of home screens displayed on a touchscreen according to some embodiments.
Figure 2B:
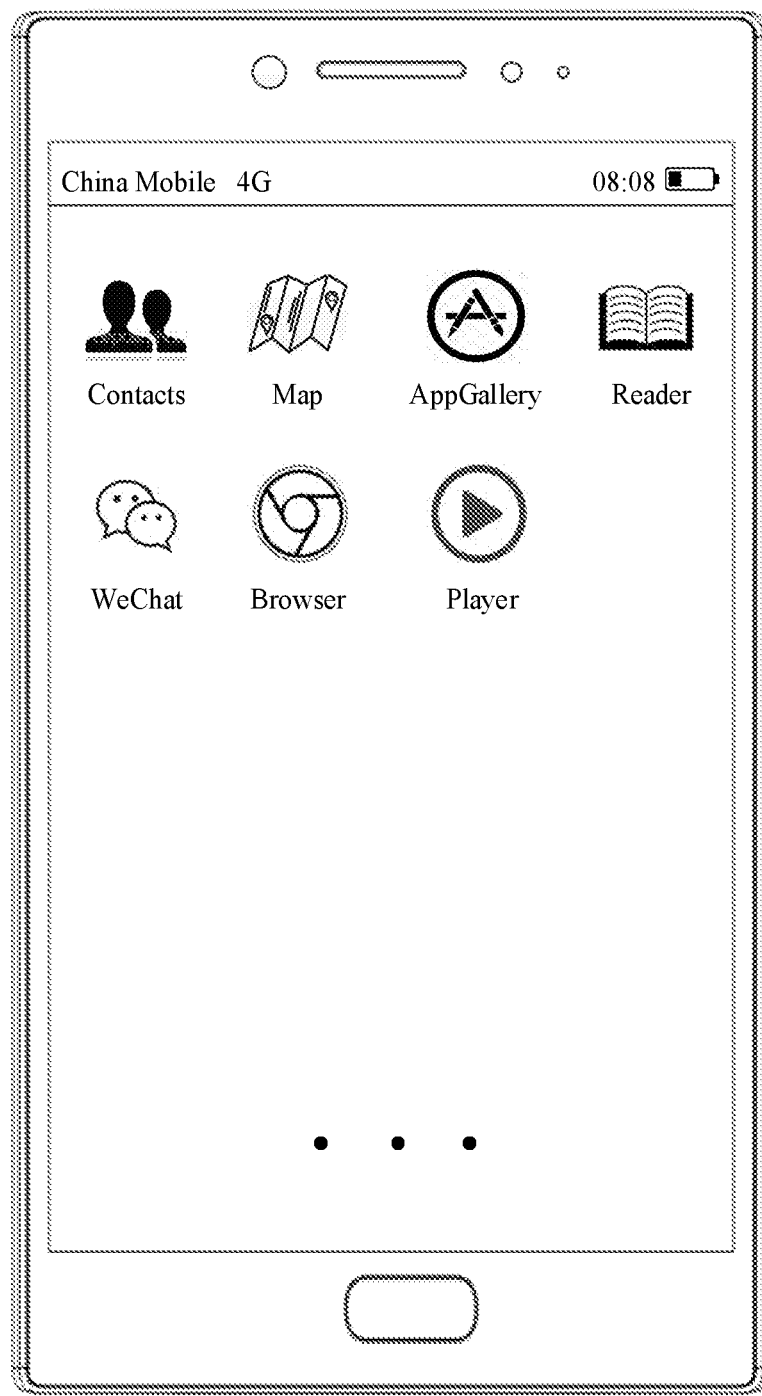

For example, FIG. 2A and FIG. 2B show a series of graphical user interfaces (graphical user interface, GUI) displayed on the touchscreen 101 of the electronic device 100. These GUIs are on a home screen (Home Screen) of the electronic device. Usually, because a size of the touchscreen 101 of the electronic device is fixed, only a limited quantity of controls can be displayed on the touchscreen 101 of the electronic device. The control is a GUI element, and is a software component, which is included in an application and controls all data processed by the application and interaction related to the data. A user can interact with the control through direct manipulation (direct manipulation) to read or edit related information of the app. Usually, the control may include visual interface elements such as an icon, a button, a menu, a tab, a text box, a dialog box, a status bar, a navigation bar, and a widget. When there are an excessive quantity of controls on the home screen of the electronic device or when the user customizes arrangement of controls on the home screen, the home screen of the electronic device may be divided into a plurality of pages (Page). For example, a GUI shown in FIG. 2A may be referred to as a page 1 (Page 1) of the home screen, a GUI shown in FIG. 2B may be referred to as a page 2 (Page 2) of the home screen, and each page may include different controls. In an example of FIG. 2A, the GUI may be the page 1 of the home screen of the electronic device. The page 1 is displayed on the display 194 of the electronic device 100, and specifically includes a status bar 201, a collapsible navigation bar 202, a home screen indicator 203, and controls of various icons (for example, an app icon and a widget icon). The home screen indicator 203 is used to indicate, to a user, a specific page that is currently displayed. For example, the page 1 includes two rows and four columns of app icons, a weather widget, and date and time. When a finger of the user (a stylus or the like) touches a position on the touchscreen 101, in response to the touch event, the electronic device may open a graphical user interface of an app corresponding to an app icon or a widget. For example, in FIG. 2A, when the finger of the user lightly taps a position that is on the touchscreen 101 and that corresponds to a weather icon 205, a weather application is started, and a graphical user interface of the weather app is displayed on the touchscreen 101. It may be understood that, in some other embodiments, a dock bar may be further displayed on the display. The dock bar may include icons of frequently used apps, and these app icons may not change with a page of the home screen on the touchscreen 101.

In some other embodiments, the electronic device may further include a home button 204. The home button 204 may be a physical button, or may be a virtual button. The home button 204 is configured to receive a user instruction to return to the home screen from a currently displayed GUI, to display a specific subscreen of the home screen, so that the user can view the home screen at any time. The instruction may be specifically an operation instruction of pressing the home button 204 once by the user, or may be an operation instruction of successively pressing the home button 204 twice by the user within a short time, or may be an operation instruction of continuously pressing the home button 204 by the user within a preset time. In some other embodiments, a fingerprint recognizer 112 may be further integrated into the home button 204, so that a fingerprint is gathered and recognized when the home button 204 is pressed.

In the prior art, a user may simultaneously press the home button 204 and a power button to perform a screenshot operation, so as to obtain a screenshot of a displayed GUI related to an app. If the user needs to further share the screenshot, after completing the screenshot operation, the user needs to tap a sharing control displayed on the touchscreen 101, select an app, and select a contact from a contact list of the app. Then, the electronic device determines the contact based on selection of the user, and sends the screenshot to the contact through the app. It can be learned from the foregoing description that operations of a screenshot sharing solution in the prior art are excessively cumbersome, and consequently efficiency of interaction between the electronic device and the user is reduced, and user experience is also severely deteriorated.

The embodiments provide a screenshot sharing method, to greatly improve sharing efficiency of the electronic device, and also improve user experience. The following describes the technical solution of the embodiments with reference to FIG. 3A to FIG. 3G to resolve the foregoing technical problem.

Figure 3A:
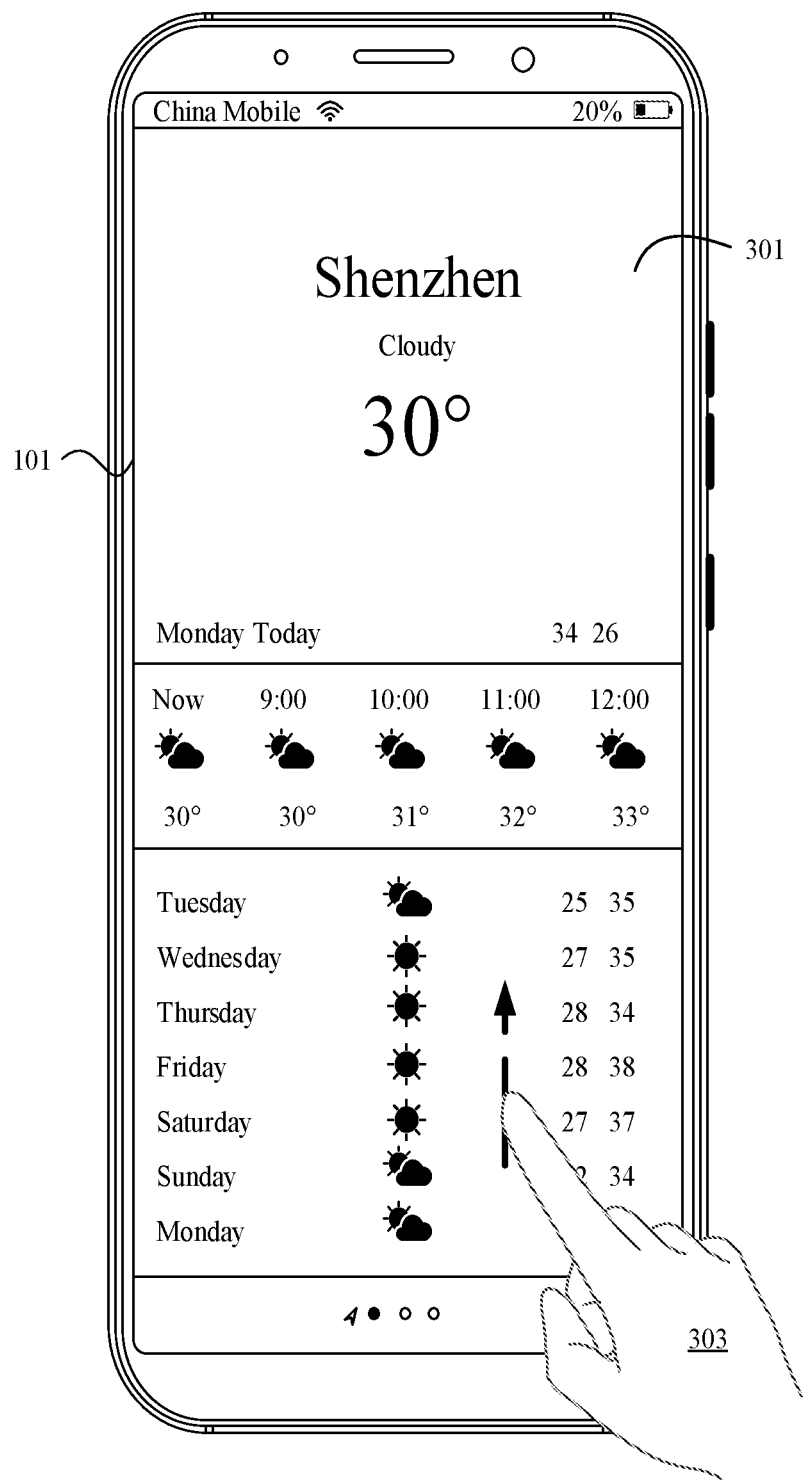
FIG. 3A to FIG. 3G are schematic diagrams of some graphical user interfaces displayed on a touchscreen according to some embodiments.

FIG. 2A shows the first page of the home screen of the electronic device 100, and there is the icon 205 of the weather app on the first page. In response to a touch operation performed by a user on the icon 205, a GUI 301 of the weather app is displayed on the touchscreen 101, as shown in FIG. 3A. The GUI displays weather information within one week in Shenzhen. The weather information includes temperatures (a highest temperature and a lowest temperature) and specific weather conditions. When the user wants to share the weather information with another user, the user may perform a screenshot operation on the GUI displayed on the touchscreen 101. For example, the screenshot operation may be that the user simultaneously presses a power button 206 and the home button 204 (as shown in FIG. 2A). Alternatively, the screenshot operation may be that the user taps a control on the touchscreen 101, and this is more quick and convenient. For another example, the screenshot operation may be based on a gesture made by the user on the touchscreen 101. When the electronic device 100 determines that the gesture is a preset gesture, the electronic device determines that the user is performing the screenshot operation. In response to the screenshot operation, the electronic device 100 executes a screenshot instruction corresponding to the screenshot operation, and displays a preview image of an obtained screenshot on the touchscreen 101.

Figure 3B:
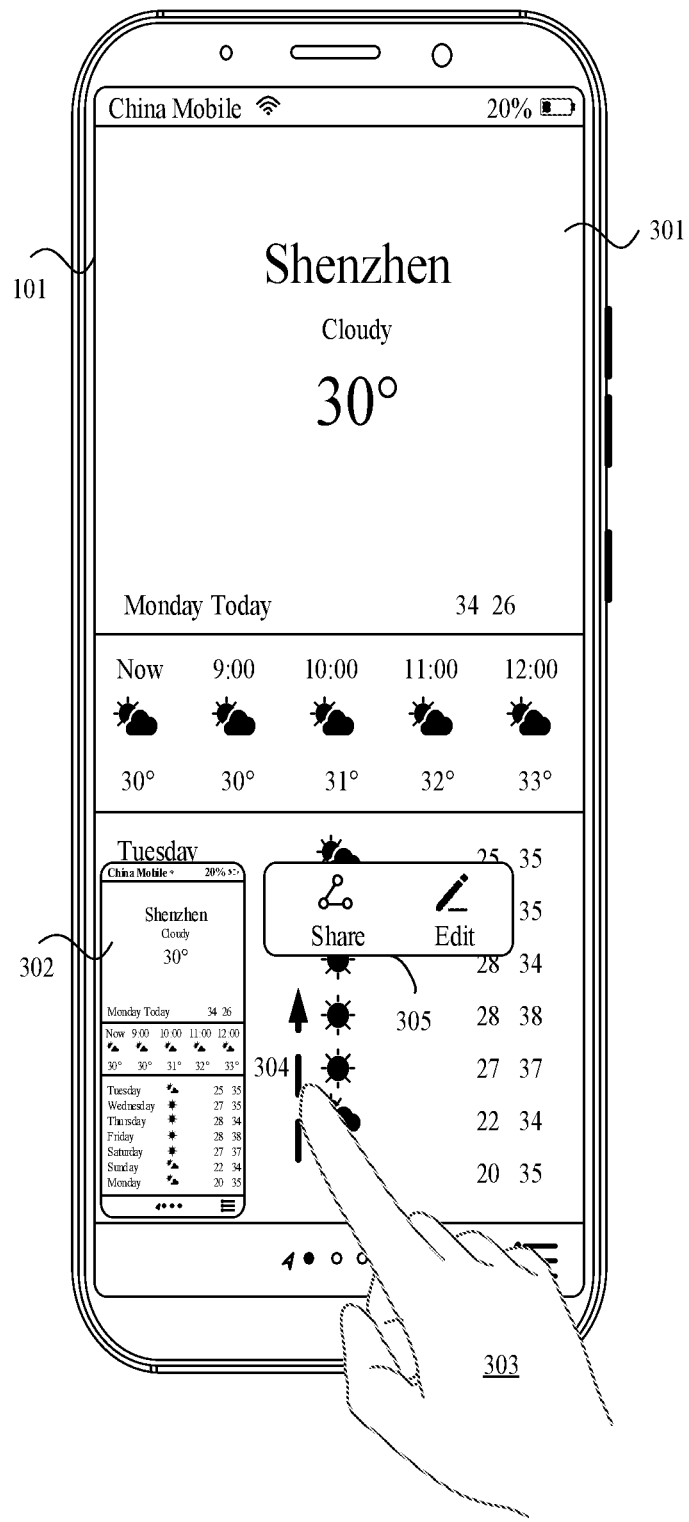

Specifically, in some embodiments, after receiving the screenshot operation performed by the user, the electronic device 100 may invoke a surface.screenshot( ) function to take a screenshot of a GUI displayed on the display 194. It may be understood that the electronic device 100 may alternatively take a screenshot in another manner. This is not limited in this embodiment. It may be understood that the obtained screenshot may be in various image formats, for example, a JPG format and a PNG format. As shown in FIG. 3B, a GUI 301 of the weather application is displayed on the touchscreen 101, and a preview image 302 of the screenshot is displayed in the lower left of the touchscreen 101. The preview image 302 may be displayed in the lower left of the touchscreen 101 with a specific scale. Certainly, the preview image may alternatively be displayed in the lower right of the touchscreen 101. In some embodiments, the preview image 302 may be displayed near two frames of the touchscreen 101 that are perpendicular to each other. To be specific, the preview image 302 is close to two frames of the display but do not coincide with the two frames. In some other embodiments, the preview image 302 may alternatively coincide with the two frames.

In some embodiments, to share the obtained screenshot with another user more conveniently and more quickly, the electronic device 100 may display the preview image 302 of the screenshot in a position that is on the touchscreen 101 and that can be touched by a finger of the user. For example, after the electronic device 100 executes the screenshot instruction, the electronic device 100 may first determine a one-hand holding posture of the user, and then display, based on the determined posture, the preview image of the screenshot in a position corresponding to the posture. For example, after executing the screenshot instruction, a mobile phone first determines a posture that the user holds the mobile phone with the left hand, and the mobile phone displays, in the lower left of the touchscreen 101 based on the posture, the preview image of the screenshot obtained by executing the screenshot instruction. In this way, the user can conveniently perform a subsequent operation such as sharing on the preview image when the user holds the electronic device with the left hand, to improve user experience. For another example, after executing the screenshot instruction, the mobile phone first determines a posture that the user holds the mobile phone with the right hand, and the mobile phone displays the preview image of the obtained screenshot in the lower right of the touchscreen 101 based on the posture. It should be noted that, how the electronic device 100 determines the one-hand holding posture of the user is the prior art in the art, and details are not described herein.

In some embodiments, after the electronic device 100 detects a touch (for example, tap) operation performed by the user on the preview image 302, in response to the touch operation, the touchscreen 101 may display a GUI for editing the screenshot corresponding to the preview image 302. The GUI may include various editing controls, for example, graphics controls such as a cropping control, a rotation control, a brightness control, and a color temperature control.

Figure 3C:
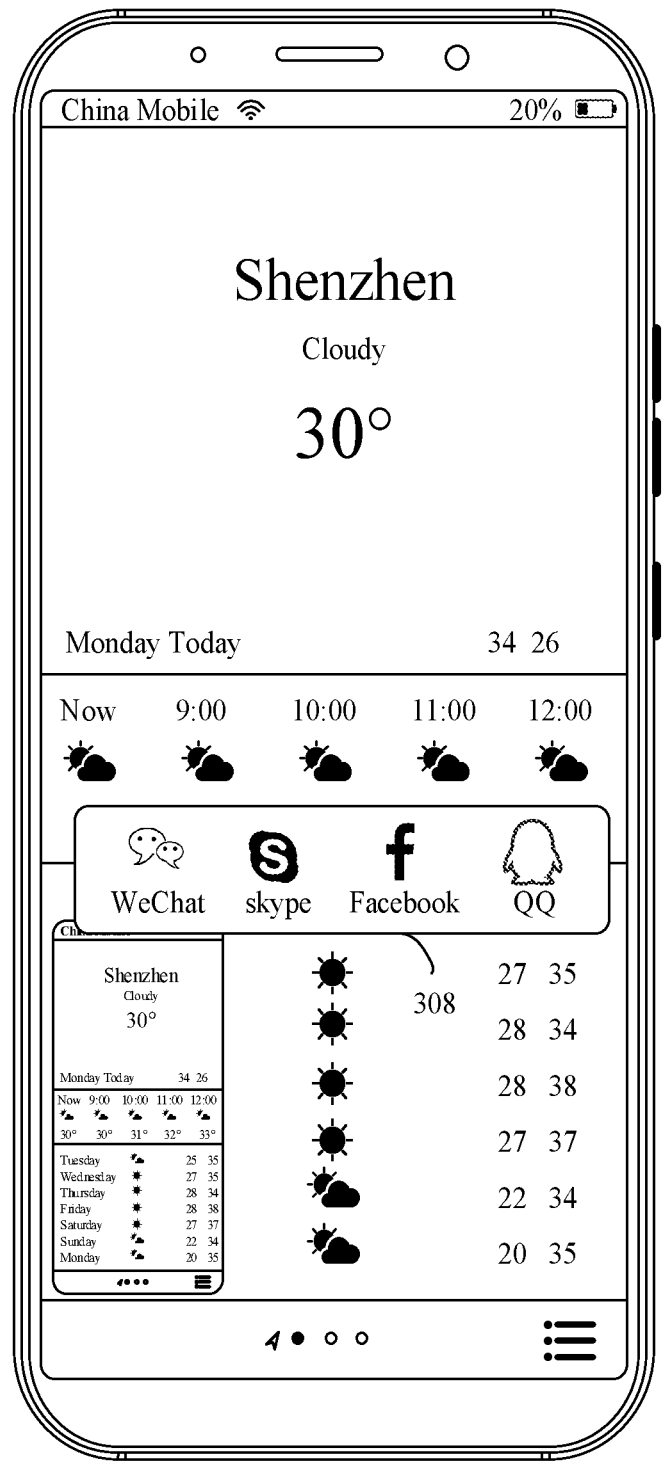

In some embodiments, as shown in FIG. 3B, after detecting that a finger 303 of the user makes an upward swipe gesture 304 on the touchscreen 101, the electronic device 100 displays a function menu 305 on the touchscreen 101 in response to the gesture. The function menu 305 may include a sharing control. After detecting a touch operation performed by the user on the sharing control, the electronic device 100 may display a submenu 308 on the touchscreen 101 in response to the touch operation, and may no longer display the original function menu 305, as shown in FIG. 3C. The submenu 308 includes some applications (Apps) that may be used to share the screenshot, for example, WeChat, Skype, Facebook, and QQ. For example, after the user touches an icon of WeChat, a contact list of WeChat may be displayed on the touchscreen 101, so that the user can conveniently select a contact with which the user wants to share the screenshot. After the electronic device 100 detects the touch operation of selecting a contact by the user, the electronic device 100 may send the screenshot 302 to the selected contact through WeChat in response to the touch operation. According to the technical solution in the foregoing embodiment, the electronic device 100 can conveniently share the screenshot with another user (for example, a contact or a friend of another app). Therefore, the foregoing technical solution improves screenshot sharing efficiency of the electronic device, and also improves user experience.

Figure 3D:
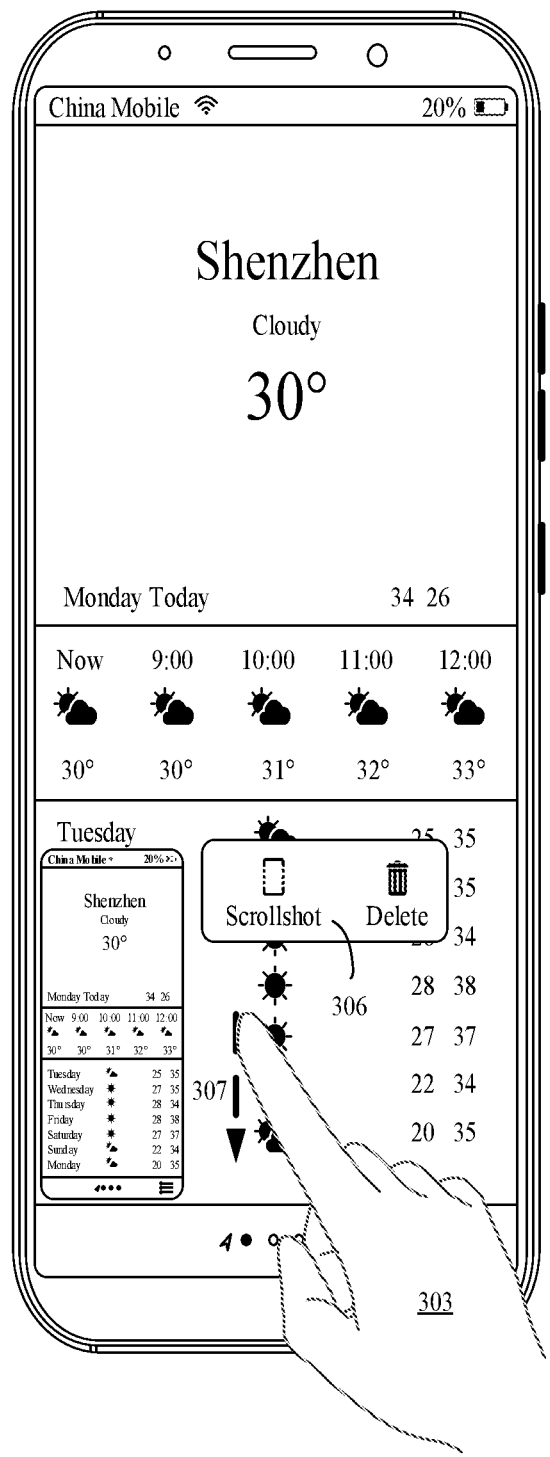
Figure 3E:
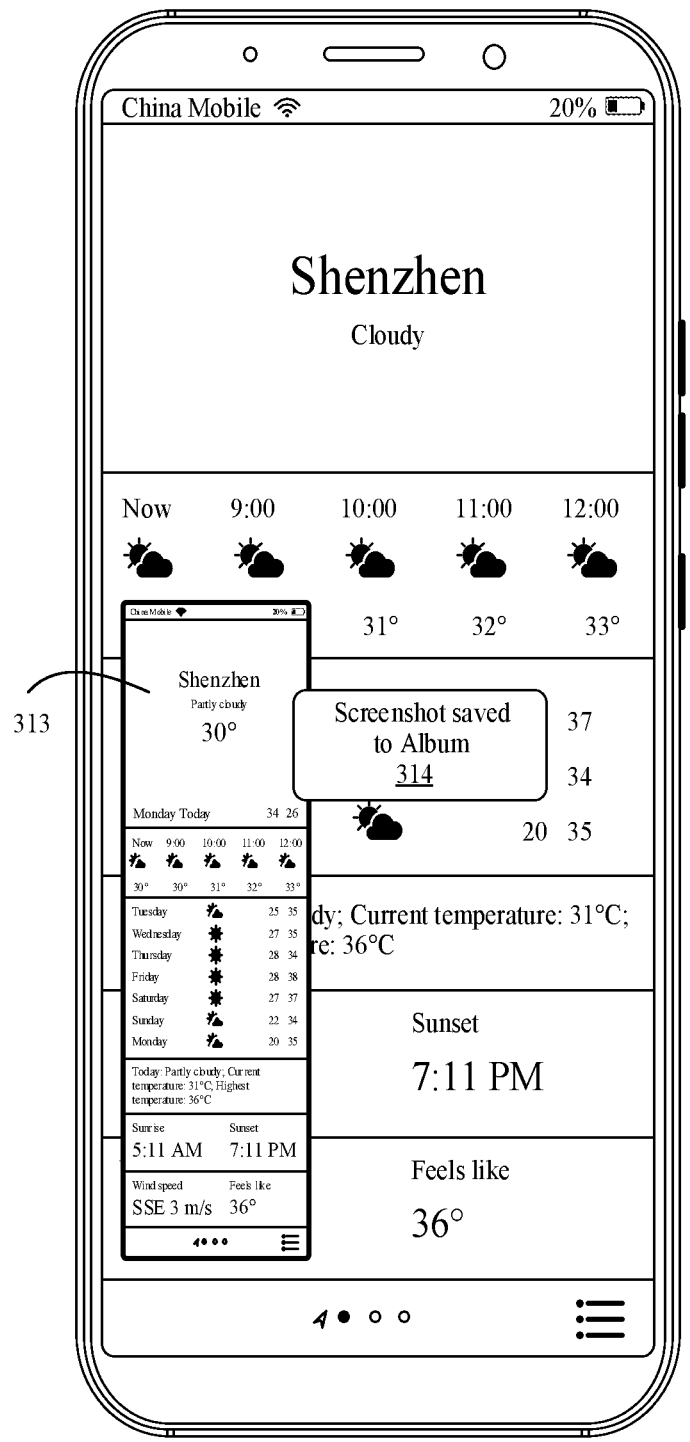

In some embodiments, after detecting that the finger 303 of the user makes a downward swipe gesture 307 on the touchscreen 101, the electronic device 100 may display a function menu 306 on the touchscreen 101 in response to the gesture, as shown in FIG. 3D. The function menu 306 includes a scrolling screenshot control. After the electronic device 100 detects a touch operation performed by the user on the control, in response to the touch operation, the electronic device executes a scrolling screenshot instruction, and displays a preview image 313 of an obtained screenshot on the touchscreen 101, as shown in FIG. 3E. In some embodiments, because content captured in a scrolling screenshot is more than content captured in a common screenshot, the preview image 313 may be slightly larger or longer than the preview image. In this way, the user can conveniently distinguish between screenshot types (the common screenshot or the scrolling screenshot).

In some embodiments, when displaying the preview image 313 on the touchscreen 101, the electronic device 100 may save the screenshot corresponding to the preview image 313 in an album, and enable a prompt box 314 to pop up on the touchscreen 101 to prompt the user. According to the technical solution in this embodiment, the electronic device 100 may automatically take a scrolling screenshot based on a gesture of the user, and automatically save the obtained screenshot in the album. In this way, screenshot processing efficiency is improved, and user experience is further improved.

Figure 3F:
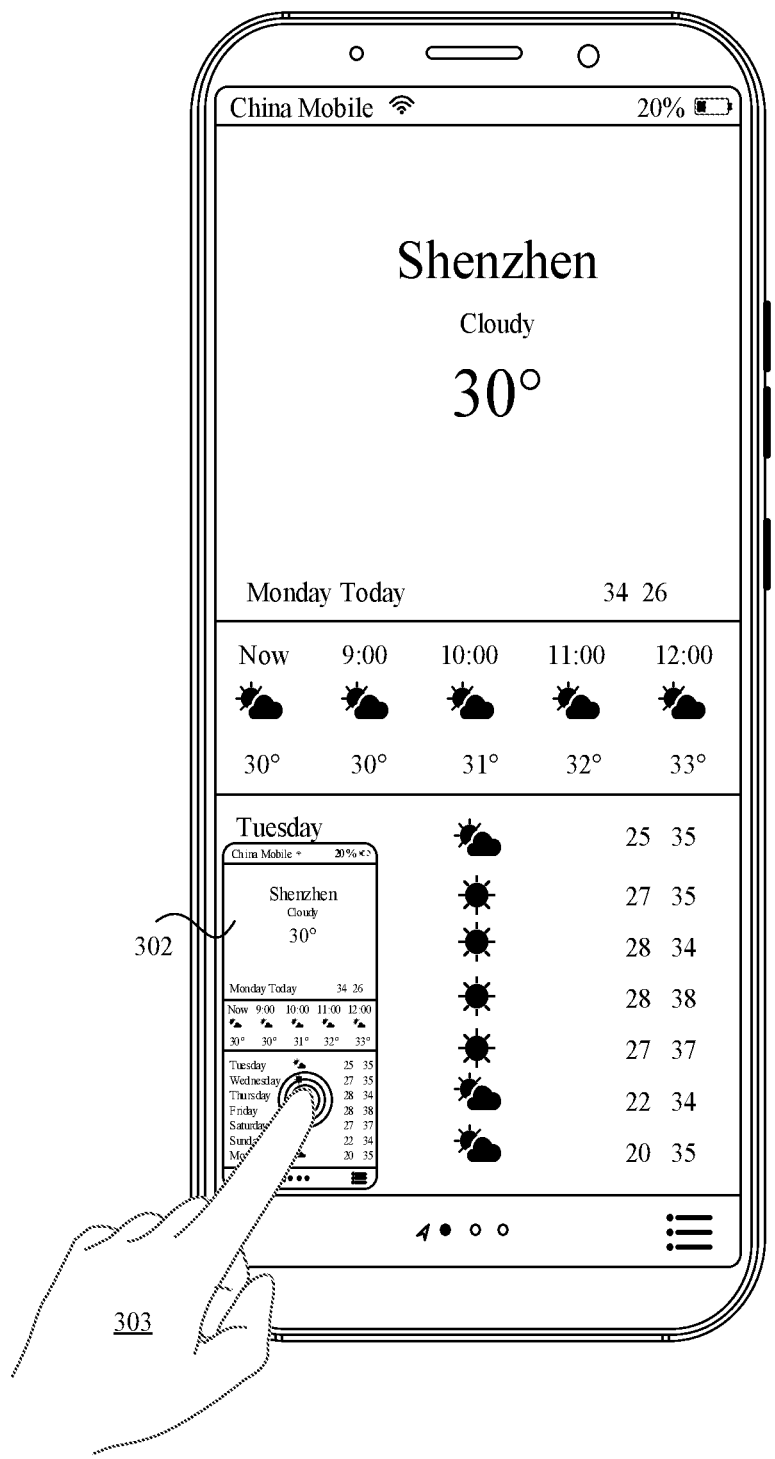
Figure 3G:
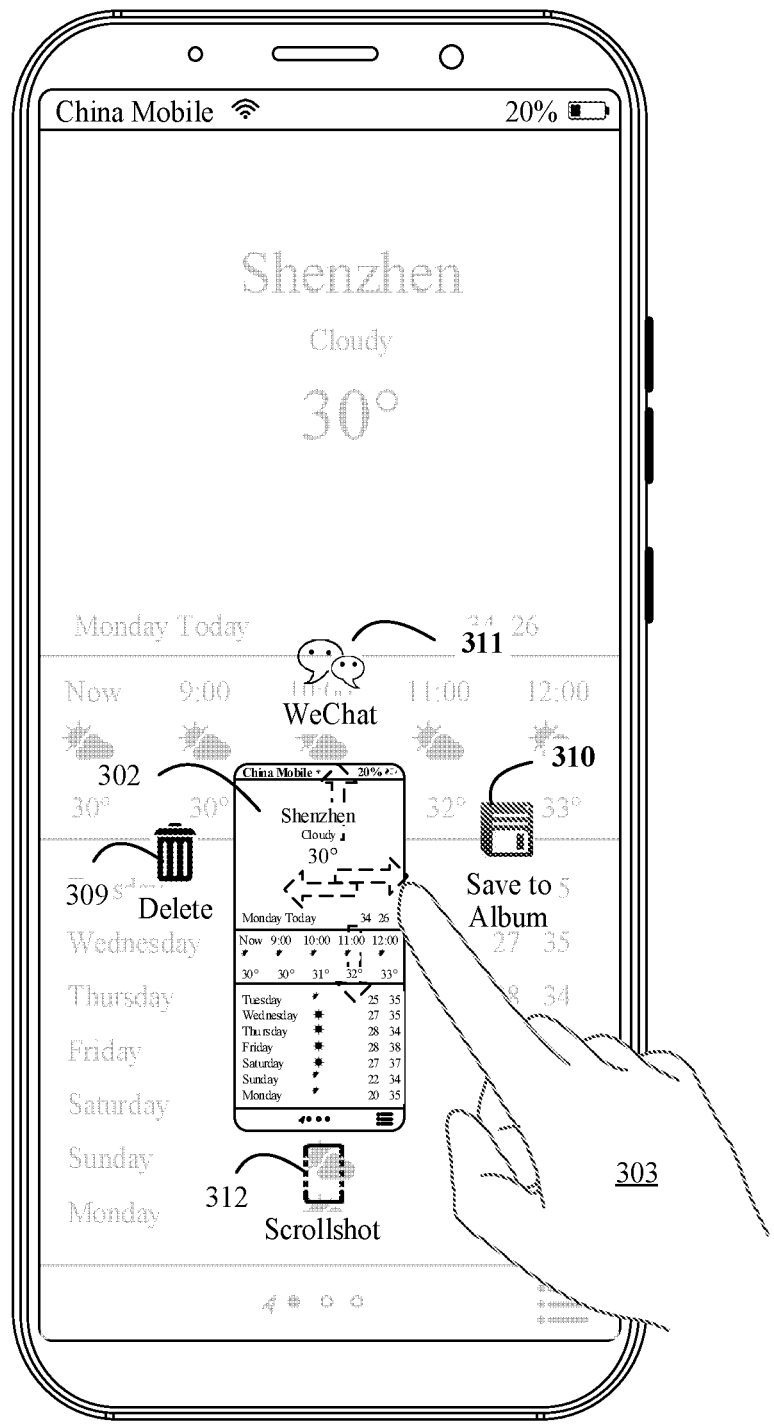

In some other embodiments, the electronic device 100 may further perform different corresponding operations on the screenshot based on different gestures of the user. For example, as shown in FIG. 3F, after executing the screenshot instruction based on the screenshot operation performed by the user, the electronic device 100 displays the preview image 302 of the obtained screenshot on the touchscreen 101. After the electronic device 100 detects a selection (for example, heavy press or touch and hold) operation performed by the finger 303 of the user on the preview image 302, in response to the selection operation, the electronic device 100 may move the preview image 302 from the lower left of the touchscreen 101 to the middle of the touchscreen 101, and display more controls, as shown in FIG. 3G. In FIG. 3G, the GUI 301 of the weather app is blurred, the preview image 302 is displayed in the middle of the touchscreen 101, and controls 309 to 312 are displayed. The control 309 is used to delete a screenshot, the control 310 is used to save the screenshot in the album, the control 311 is used to share the screenshot with a WeChat contact, and the control 312 is used to take a scrolling screenshot.

For example, as shown in FIG. 3G, when detecting a leftward swipe gesture made by the user on the preview image 302, the electronic device 100 executes a screenshot deletion instruction in response to the gesture. When detecting a rightward swipe gesture made by the user on the preview image 302, the electronic device 100 executes a screenshot saving instruction in response to the gesture. When detecting an upward swipe gesture made by the user on the preview image 302, the electronic device 100 executes a screenshot sharing instruction in response to the gesture. When detecting a downward swipe gesture made by the user on the preview image 302, the electronic device 100 executes a scrolling screenshot instruction in response to the gesture. In this way, the user can perform different operations on the screenshot based on different gestures, to improve screenshot processing efficiency of the electronic device, and further improve user experience.

It may be understood that, in some other embodiments, in FIG. 3G, the finger 303 of the user may alternatively tap one of the controls to execute a corresponding instruction, and does not need to make an upward swipe gesture, a downward swipe gesture, or the like. For example, after the finger 303 of the user taps the control 309, the screenshot corresponding to the preview image 302 is deleted in response to the tap operation, and the GUI 301 of the weather app is displayed on the touchscreen 101 again. For another example, after the finger 303 of the user taps the control 312, the electronic device 100 performs a scrolling screenshot operation in response to the tap operation. This control-based manner can improve accuracy of screenshot processing performed by the user, and avoid a false operation on a screenshot that is caused by an incorrect gesture.

In some other embodiments, based on FIG. 3F, after the electronic device 100 detects a selection (for example, heavy press or touch and hold) operation performed by the finger 303 of the user on the preview image 302, in response to the selection operation, the electronic device 100 may enable the preview image 302 to be in an intermediate state. The intermediate state is used to prompt the user to perform a next operation on the preview image 302, for example, the user may make a swipe gesture on the preview image. The intermediate state may be presented on the touchscreen 101 as follows: The preview image 302 is displayed with a larger size, or a display effect of the preview image 302 is shaking, or a display effect of the preview image 302 is floating. In some other embodiments, in addition to the foregoing presentation, the intermediate state may be further presented as follows: The controls 309 to 312 are displayed around the preview image 302, to further prompt the user to perform a next operation.

A display effect used to indicate that the preview image 302 is in the intermediate state is presented on the touchscreen 101, so that an operation guide can be provided for the user very intuitively. The operation guide can guide the user to continue to perform a subsequent operation on the preview image 302 when the finger of the user does not leave the touchscreen 101 after the selection operation. In this way, an operation time of the user is reduced, and user experience is further improved.

For example, when the finger of the user does not leave the touchscreen 101 after the selection operation such as a touch and hold operation, the user may continue to make a downward swipe gesture. The electronic device 100 may perform a scrolling screenshot operation in response to the downward swipe gesture. Alternatively, when the finger of the user does not leave the touchscreen 101 after the selection operation such as a touch and hold operation, the user may continue to make an upward swipe gesture. The electronic device 100 may perform a screenshot sharing operation in response to the upward swipe gesture. According to the technical solution in the foregoing embodiment, the electronic device 100 may perform next processing on a screenshot in response to a selection operation performed by the user on a preview image of the screenshot. In this way, screenshot processing efficiency of the electronic device 100 is improved, and user experience is further improved.

Figure 4A:
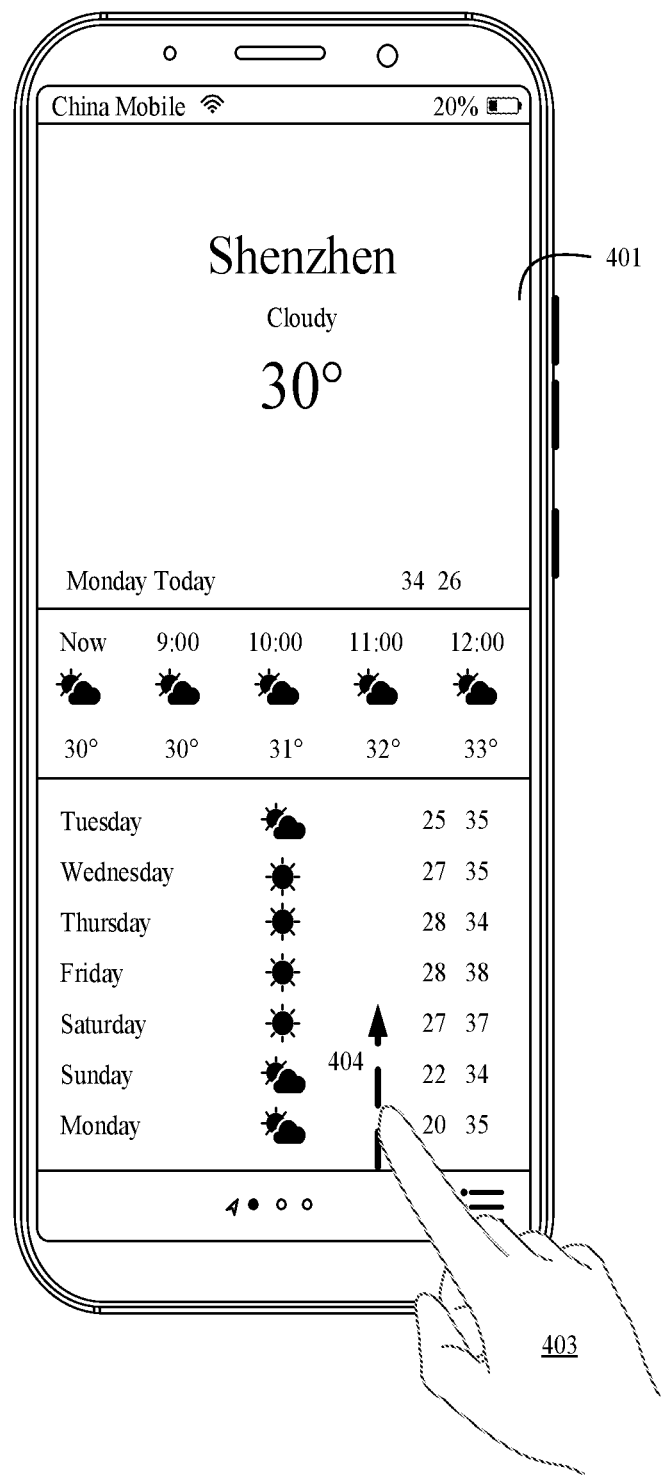
FIG. 4A to FIG. 4J are schematic diagrams of some graphical user interfaces displayed on a touchscreen according to some other embodiments.
Figure 4B:
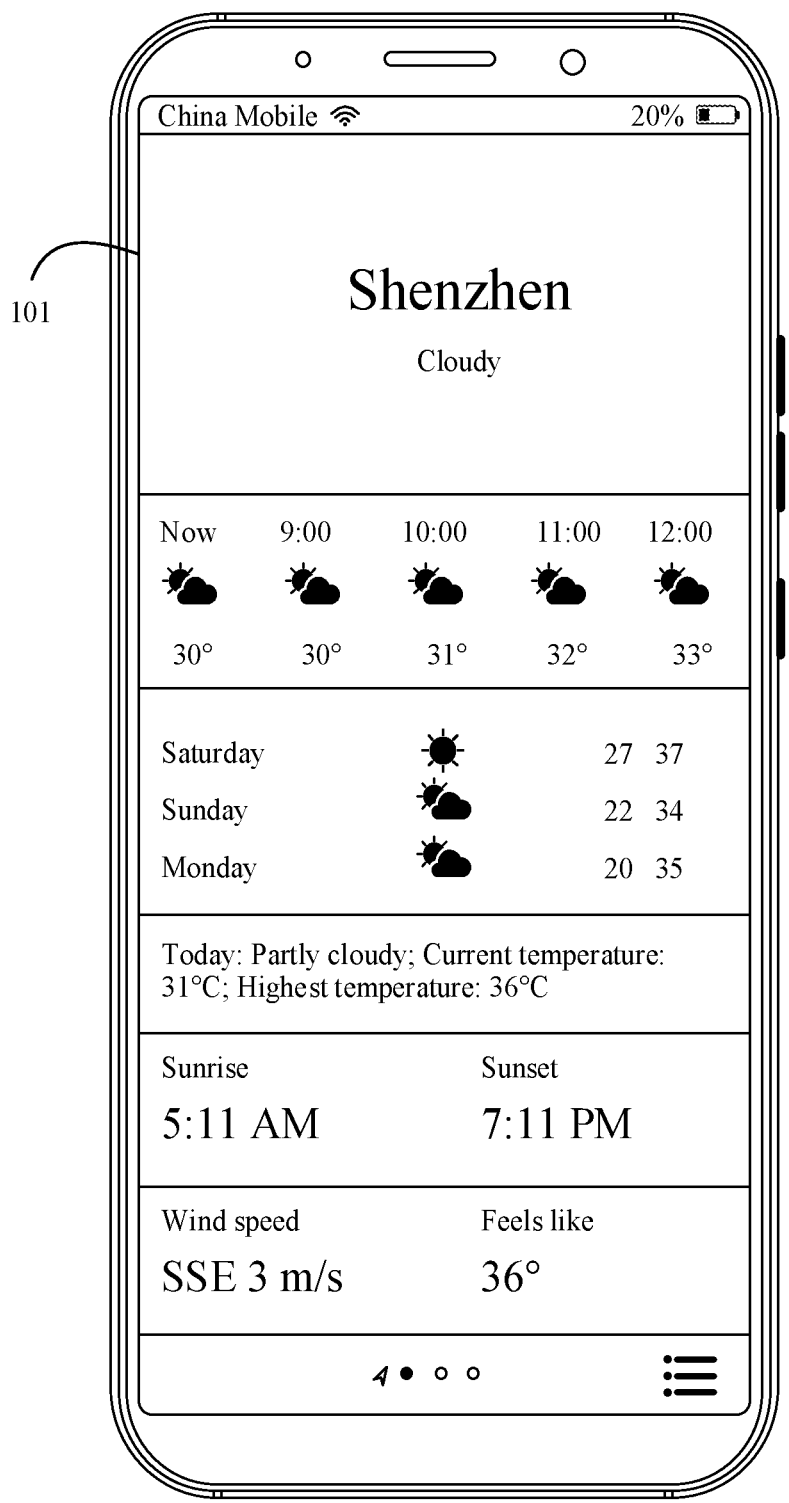

In some other embodiments, based on FIG. 3F, after the electronic device 100 detects a selection (for example, press or touch and hold) operation performed by the finger 303 of the user on the preview image 302, if the finger 303 of the user further makes a swipe gesture, the electronic device 100 may perform different processing on the preview image 302 in response to the swipe gesture. In other words, in this embodiment, the electronic device 100 may not need to enable the preview image 302 to be in the intermediate state. Only when the electronic device 100 detects the swipe gesture (for example, the gesture 304 or 307) made by the user after detecting the selection operation such as a press operation or a touch and hold operation on the preview image 302, the electronic device 100 performs corresponding processing on the preview image 302 in response to the swipe gesture. For specific processing, refer to the foregoing embodiment. Details are not described herein again. FIG. 2A shows the first page of the home screen of the electronic device 100, and there is the icon 205 of the weather app on the first page. In response to a touch operation performed by a user on the icon 205, a GUI 401 of the weather app is displayed on the touchscreen 101, as shown in FIG. 4A. The GUI displays weather information within one week in Shenzhen. The weather information includes temperatures (a highest temperature and a lowest temperature) and specific weather conditions. When the electronic device 100 detects an upward swipe gesture 404 of a finger 403 of the user in the GUI, in response to the gesture 404, the GUI of the weather app also scrolls with swiping of the gesture, and displays more weather information. As shown in FIG. 4B, the GUI displays weather information that is not displayed in FIG. 4A, for example, today's detailed weather conditions: a sunrise time, a sunset time, a wind speed, and an apparent temperature.

When the user wants to take a screenshot to obtain all weather information in FIG. 4A and FIG. 4B, the user usually needs to first take a common screenshot (the screenshot is the content displayed in the GUI 401 in FIG. 4A) by using a preset gesture or by using a physical button, and then performs a scrolling screenshot operation by tapping a control displayed on the touchscreen 101. Alternatively, the user may first take a screenshot to obtain the content in FIG. 4A, then take a screenshot to obtain the content in FIG. 4B, and next combine the two screenshots into one scrolling screenshot (which may also be referred to as a long screenshot) by using an algorithm. It can be learned from the foregoing description that operations of the two scrolling screenshot methods are cumbersome and greatly reduce use efficiency of the electronic device.

To resolve the foregoing technical problem, the embodiments provide a scrolling screenshot method, to greatly improve scrolling screenshot efficiency of the electronic device 100, and also improve user experience. A specific implementation solution is described in detail in the following embodiments.

Figure 4C:
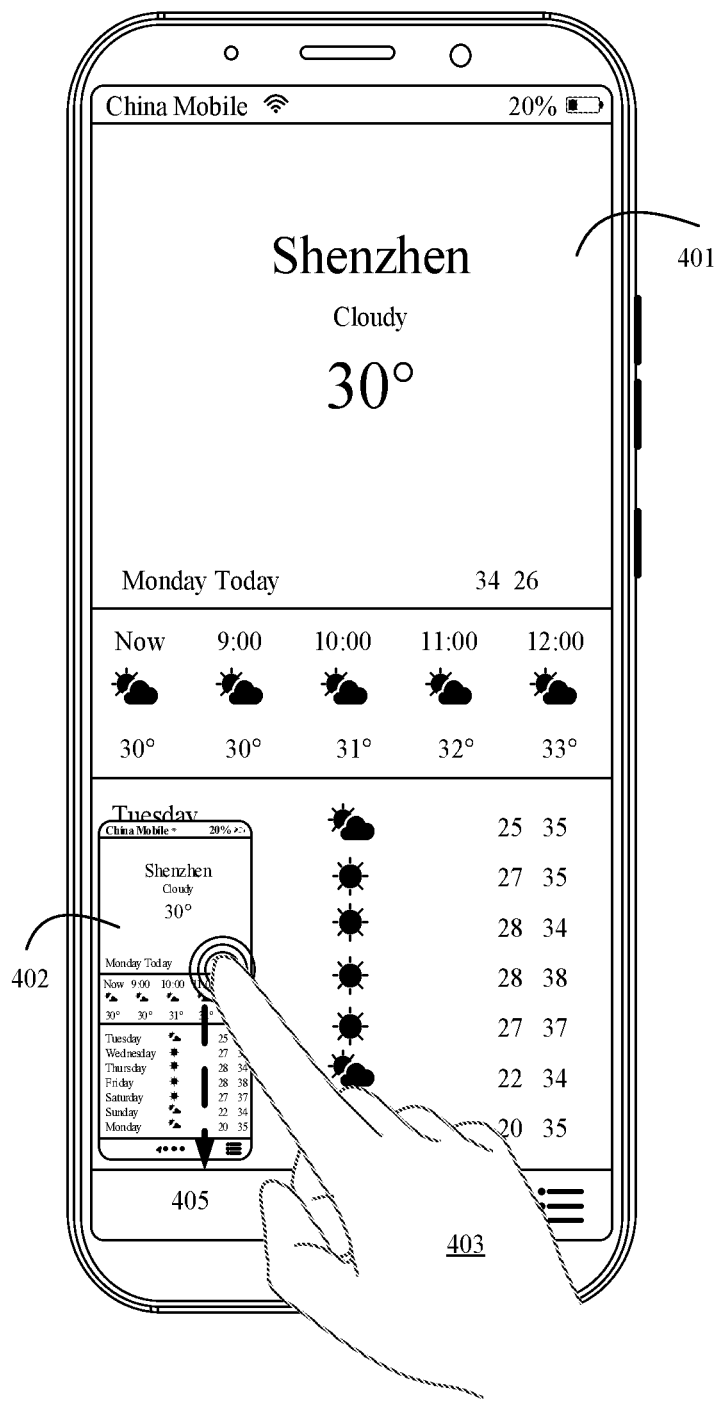

As shown in FIG. 4C, after the user performs a screenshot operation on the GUI 401, the electronic device 100 executes a screenshot instruction in response to the screenshot operation, and displays a preview image 402 of a screenshot on the touchscreen 101. The preview image 402 is a preview image that is of the GUI 401 currently displayed on the touchscreen 101 and that is captured by the electronic device 100. After the finger 403 of the user taps the preview image 402, a GUI for editing the screenshot corresponding to the preview image 402 may be displayed on the touchscreen 101. The GUI may include various editing controls, for example, graphics controls such as a cropping control, a rotation control, a brightness control, and a color temperature control.

Figure 4D:
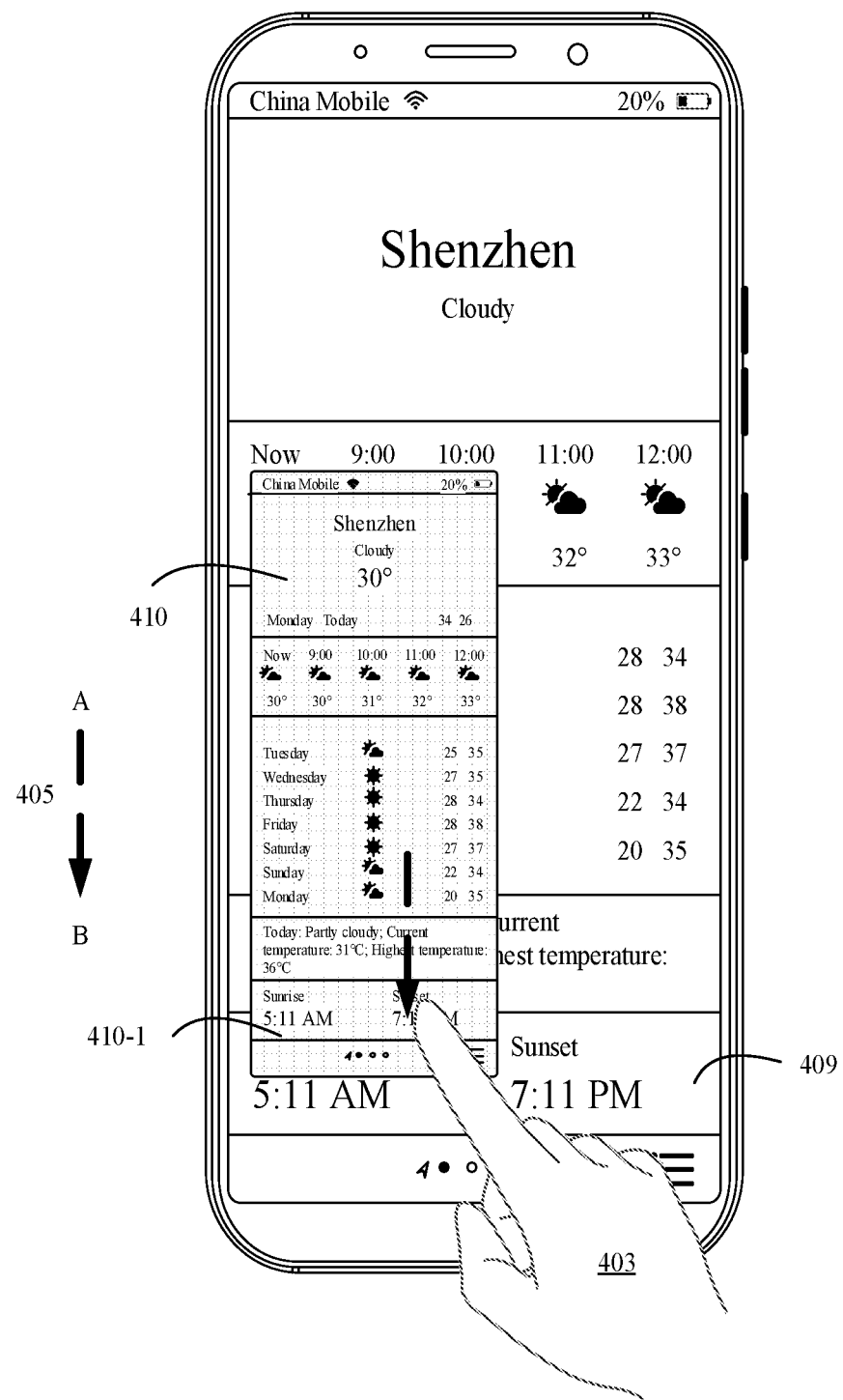

In some embodiments, as shown in FIG. 4C, after the electronic device 100 detects a heavy press selection operation or a touch and hold selection operation performed by the finger 403 of the user on the preview image 402, the electronic device 100 further detects a downward swipe gesture 405 made by the user. In response to the gesture 405, the electronic device 100 performs a scrolling screenshot operation, and displays a preview image 403 of a captured scrolling screenshot on the touchscreen 101, as shown in FIG. 4F. In FIG. 4F, the finger 403 of the user has been lifted from the touchscreen 101, and the preview image 403 of the scrolling screenshot is displayed on the touchscreen. In some other embodiments, in response to that the finger 403 of the user lifts from the touchscreen 101, the electronic device 100 may automatically save the obtained scrolling screenshot (namely, a long screenshot), and may display a prompt box 404 on the touchscreen. The prompt box 404 is used to inform the user that the scrolling screenshot has been saved in an album. FIG. 4H is a schematic diagram of a screenshot obtained after the electronic device 100 performs a scrolling screenshot operation. Content in the screenshot may be all weather information displayed in FIG. 4A and FIG. 4B. In some other embodiments, as shown in FIG. 4H, the electronic device may display an indicator 413 in the screenshot, and the indicator 413 is used to indicate screenshot software through which the screenshot is taken.

It should be noted that, in the foregoing embodiment, if the electronic device 100 does not detect a heavy press selection operation or a touch and hold selection operation performed by the user on the preview image 402, but detects a gesture 405 made by the user, the electronic device 100 may hide the preview image 402 in response to the gesture 405. In this case, the GUI 401 of the weather app is still displayed on the touchscreen 101, and the preview image 402 is no longer displayed, as shown in FIG. 4A. In other words, only when the electronic device 100 detects the heavy press selection operation or the touch and hold selection operation, the gesture 405 indicates that the user wants to perform a scrolling screenshot operation, and the electronic device performs the scrolling screenshot operation in response to the gesture 405. In this way, a problem of incorrectly taking a scrolling screenshot that is caused by a false operation of the user is avoided, thereby improving user experience.

In some other embodiments, when the electronic device 100 detects that the finger of the user makes a downward swipe gesture 405 on the preview image 402, in response to the gesture 405, the electronic device 100 performs a scrolling screenshot operation, and displays a thumbnail preview image 403 of a captured scrolling screenshot on the touchscreen 101. In this embodiment, the user does not need to first touch and hold or heavily press the preview image 402, but taps the preview image 402 and then drags the preview image 402 down. In this way, the electronic device can accordingly perform the scrolling screenshot operation, and update the preview image 402 to a preview image 411.

In some other embodiments, after the finger 403 of the user performs a heavy press selection operation or a touch and hold selection operation on the preview image 402, in response to the selection operation, the electronic device 100 may enable the preview image 402 to be in an intermediate state. The intermediate state is used to prompt the user to perform a next operation on the preview image 302, for example, the user may make a swipe gesture on the preview image. The intermediate state may be presented on the touchscreen 101 as follows: The preview image 402 is displayed with a larger size, or a display effect of the preview image 402 is shaking, or a display effect of the preview image 402 is floating. In some other embodiments, in addition to the foregoing presentation, the intermediate state may be further presented as follows: The controls 309 to 312 are displayed around the preview image 302, to further prompt the user to perform a next operation. In this way, use efficiency of the electronic device 100 is further improved, and user experience is further improved. A display effect used to indicate that the preview image 402 is in the intermediate state is presented on the touchscreen 101, so that the electronic device 100 can provide an operation guide for the user very intuitively. The operation guide can guide the user to continue to perform a subsequent operation on the preview image 402 when the finger of the user does not leave the touchscreen 101 after the selection operation. In this way, an operation time of the user is reduced, and user experience is further improved.

In some other embodiments, the electronic device 100 may accordingly capture, based on a swipe distance of the gesture 405 on the touchscreen 101, a part or all of content of the weather app that is not displayed in FIG. 4A, and may dynamically display preview images of different screenshots on the touchscreen 101. A larger swipe distance of the gesture 405 indicates more captured content, and vice versa.

For example, as shown in FIG. 4C, the electronic device 100 detects the downward swipe gesture 405 of the user on the preview image 402. The electronic device 100 starts to perform a scrolling screenshot operation on the weather app in response to the gesture 405. As shown in FIG. 4D, when the gesture 405 swipes from a position A on the touchscreen to a position B on the touchscreen 101, a preview image 410 of an obtained screenshot is displayed on the touchscreen 101. This indicates that a scrolling screenshot corresponding to a swipe distance AB from the position A to the position B is a screenshot represented by the preview image 410. Specifically, in the preview image 410, content 410-1 at the bottom of the obtained screenshot can be seen. A screenshot including content from a captured status bar to the content 410-1 at the bottom is the screenshot corresponding to the swipe distance from the position A to the position B of the gesture 405.

Figure 4E:
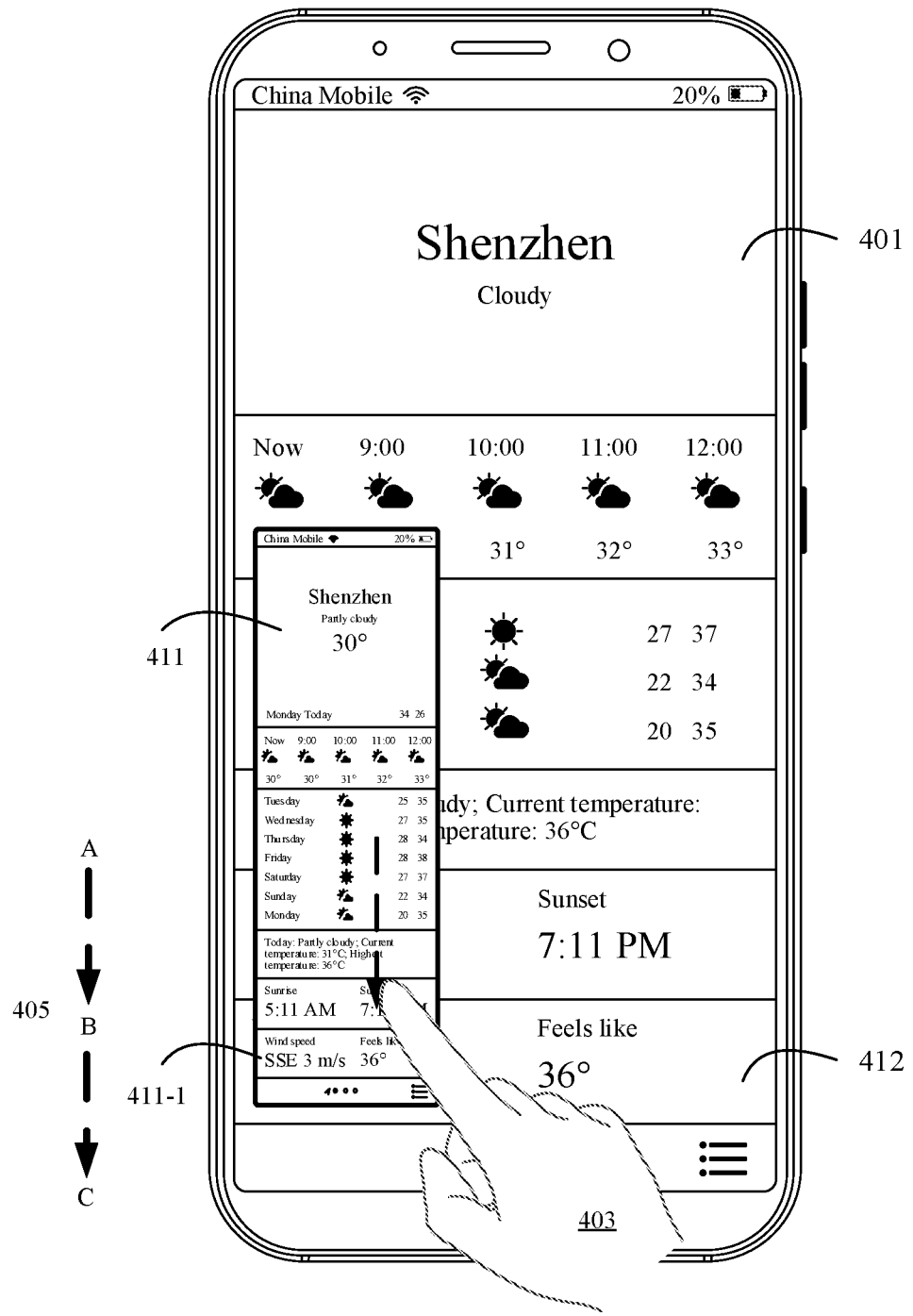
Figure 4F:
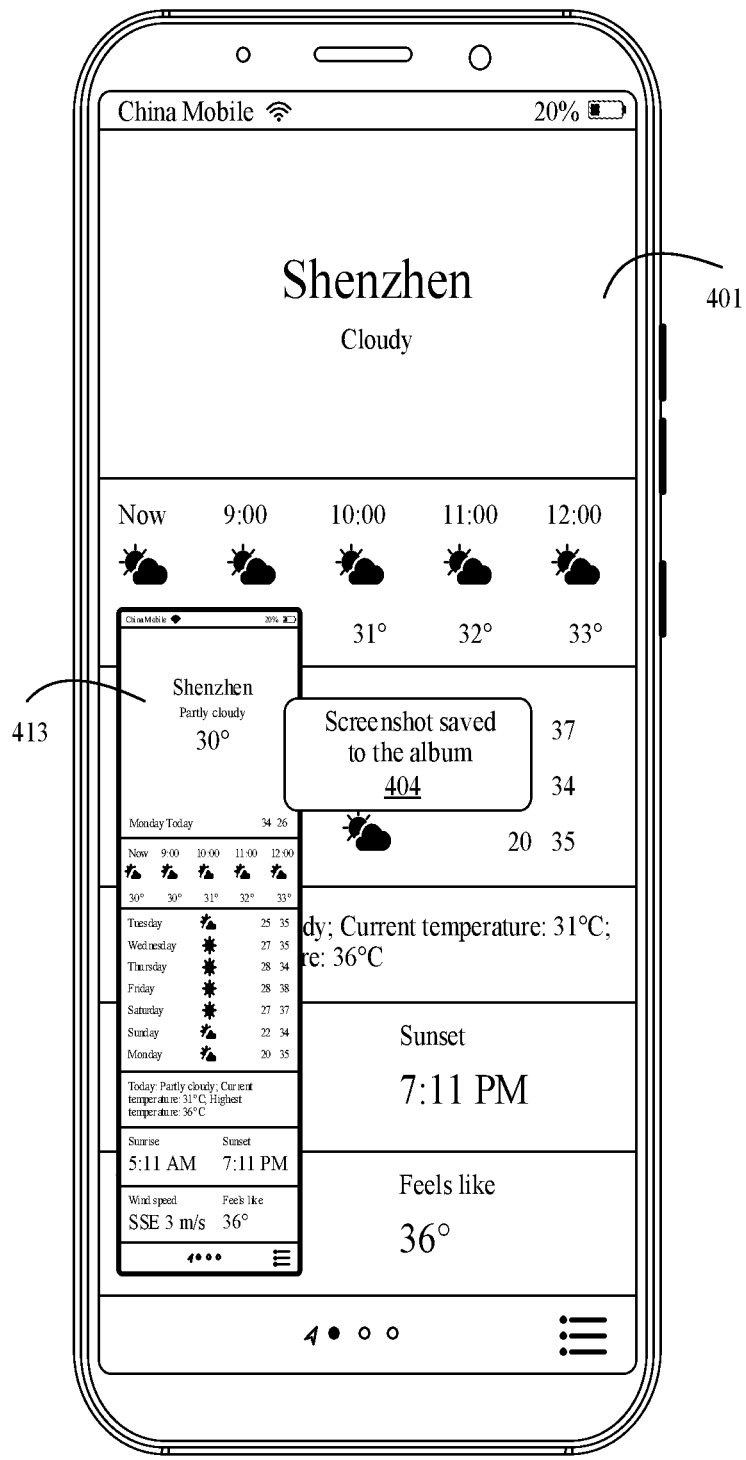

As shown in FIG. 4E, after the gesture 405 swipes from a position A to a position B, and continues to swipe to a position C, a preview image 411 of an obtained screenshot is displayed on the touchscreen. This indicates that a scrolling screenshot corresponding to a swipe distance AC from the position A to the position C is a screenshot represented by the preview image 411. Specifically, in the preview image 411, content 411-1 at the bottom of the obtained screenshot can be seen. A screenshot including content from a captured status bar to the content 411-1 at the bottom is the screenshot corresponding to the swipe distance from the position A to the position C of the gesture 405. In this case, when the user continues to perform a swipe operation, for example, swipes from the position C to a position D (not shown in the figure), in response to a touch operation that the gesture 405 swipes from the position C to the position D, a prompt box is displayed on the touchscreen 101. The prompt box is used to inform the user that there is no extra content for screenshot currently. In other words, because screenshots for all content of the weather app have been taken, the electronic device 100 cannot obtain a corresponding screenshot based on a swipe distance from the position C to the position D. In this way, the prompt box may be used to prompt the user, so that user experience of taking a scrolling screenshot can be further improved. It may be understood that the position A, the position B, and the position C may be all located in each preview image, or may be all located outside each preview image.

In some other embodiments, in a process in which the user makes the downward swipe gesture 405, a preview image of a screenshot that is displayed on the touchscreen 101 may be automatically updated and displayed. In some other embodiments, the preview image is automatically updated with the swipe distance of the gesture 405, and the GUI of the weather app may also be automatically updated and displayed with the swipe distance of the gesture 405. For example, as shown in FIG. 4D, if the electronic device detects that the gesture 405 swipes from the position A to the position B, the preview image 402 is updated to the preview image 410, screenshot content corresponding to the swipe distance AB is added to the preview image 410, and an updated GUI of the weather app is displayed on the touchscreen 101 and a weather condition 409 is included. Content of the weather condition 409 is the same as content of the weather condition 410-1 in the preview image 410, that is, the GUI of the weather app is automatically updated. Likewise, after the gesture 405 swipes from the position A to the position B, and continues to swipe to a position C, the preview image 410 is updated to the preview image 411, screenshot content corresponding to a swipe distance BC is added to the preview image 411, and an updated GUI of the weather app is displayed on the touchscreen 101 and a weather condition 411 is included. Content of the weather condition 411 is the same as content of the weather condition 411-1 in the preview image 411, that is, the GUI of the weather app is automatically updated again. It should be understood that, as long as the swipe distance is changed (for example, is increased or decreased), the GUI of the weather app is automatically updated accordingly, and the preview image is also automatically updated and displayed. According to the foregoing technical solution, the electronic device 100 can prompt, by using a preview image or a GUI that is automatically updated on the touchscreen, the user with a real-time status of a scrolling screenshot when the gesture made by the user to take a scrolling screenshot swipes, to further guide the user to correctly take a screenshot, improve scrolling screenshot efficiency of the electronic device, and further improve user experience.

In some other embodiments, the user alternatively makes the downward swipe gesture 405 in an opposite direction (for example, upward). In this case, the preview image may also be automatically updated. For example, as shown in FIG. 4E, the gesture 405 may swipe from the position A to the position C. In this case, the preview image 411 is displayed on the touchscreen 101. Then, the user makes an upward swipe gesture 415 (not shown in the figure) when the finger of the user does not leave the touchscreen 101. The gesture 415 swipes upward from the position C to the position B. In this case, the preview image 411 may be automatically updated to the preview image 410, and this indicates that content in a scrolling screenshot is accordingly reduced. The preview image 410 is displayed on the touchscreen 101, as shown in FIG. 4D.

Figure 4G:
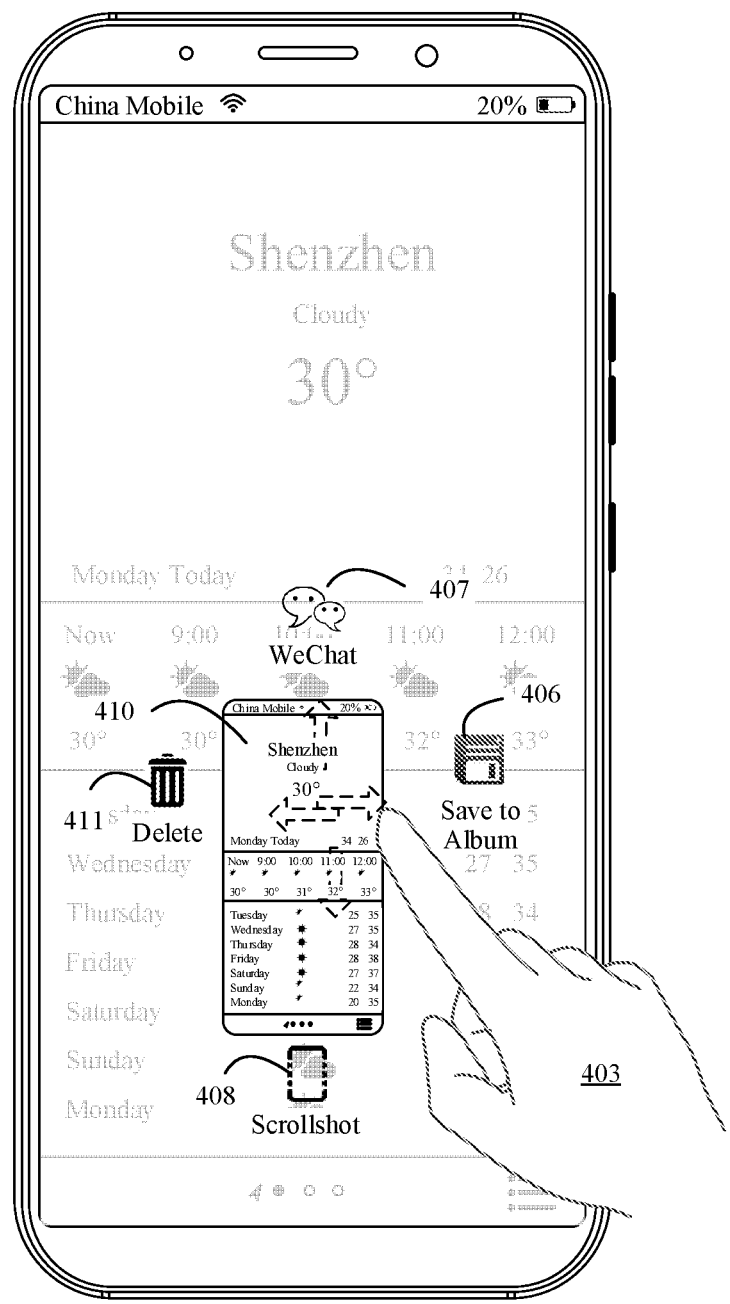
Figure 4H:
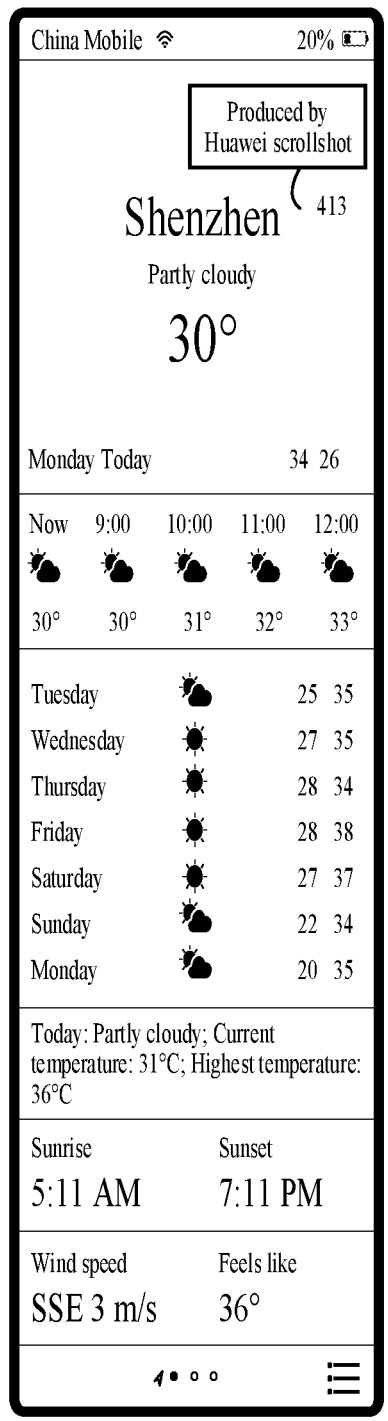
Figure 4I:
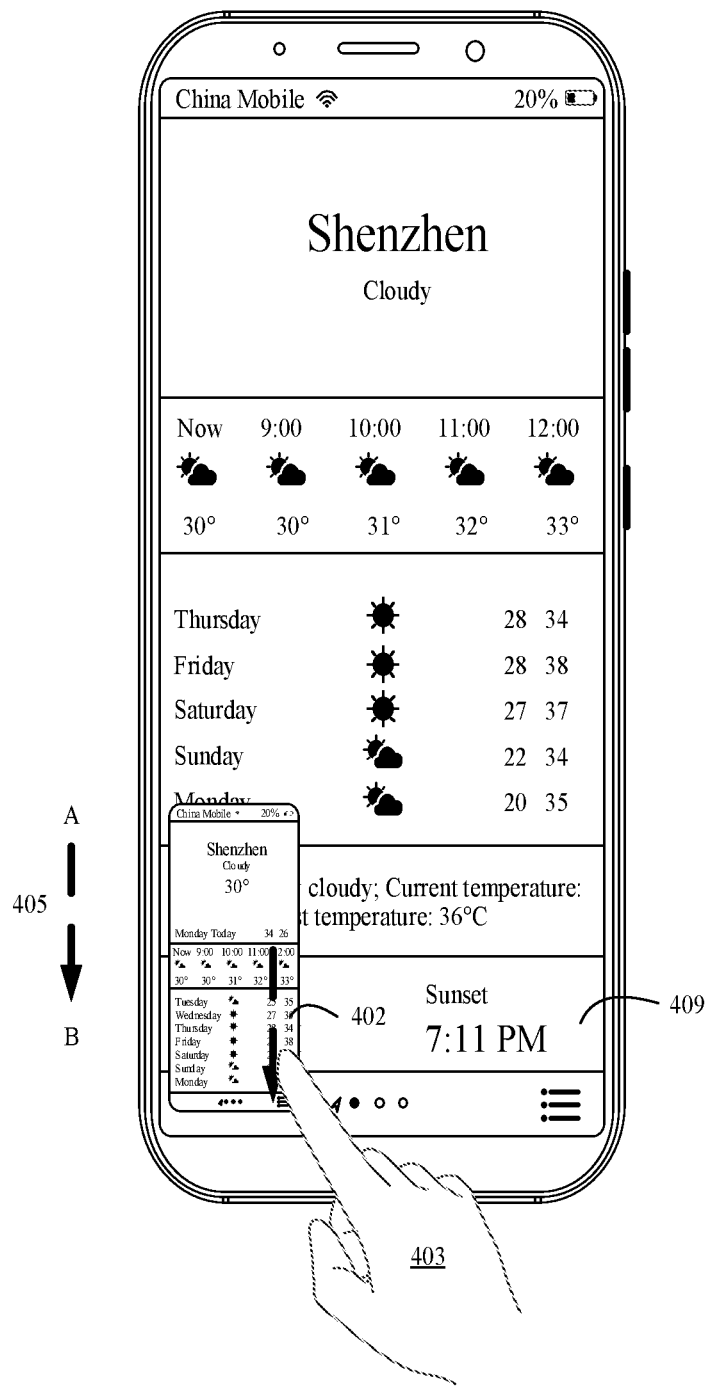
Figure 4J:
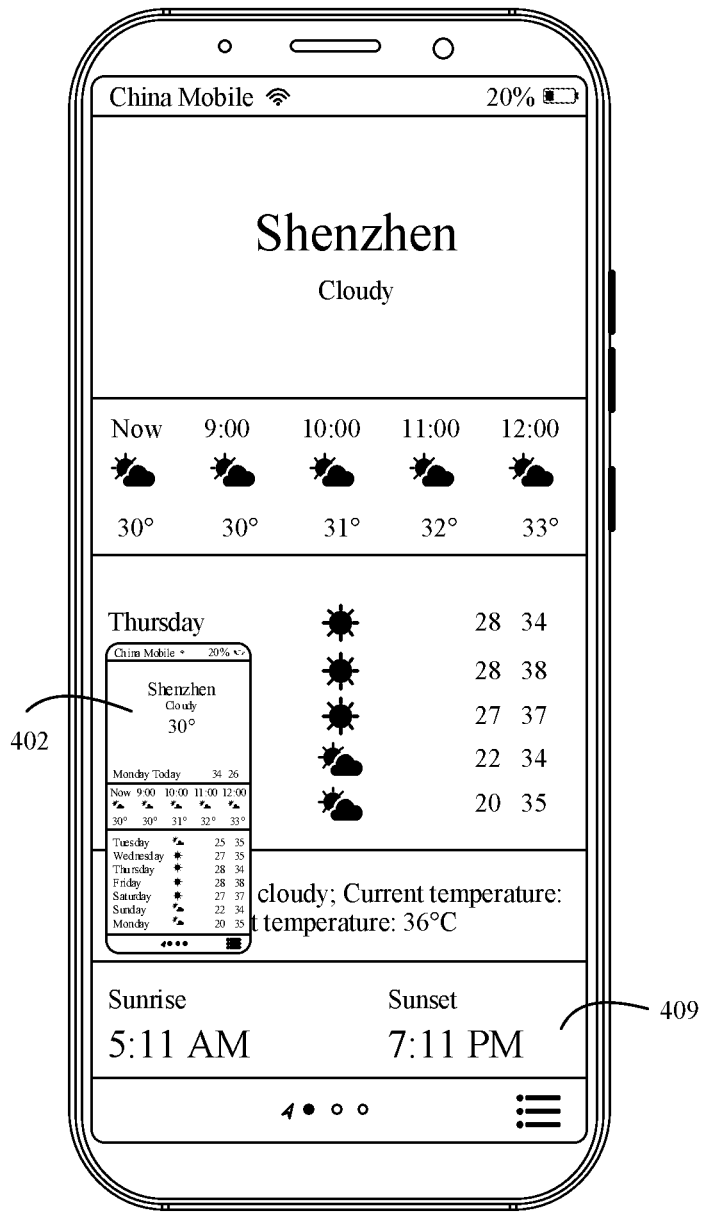

In some other embodiments, when the finger 403 of the user makes the downward swipe gesture 405 on the preview image 402, a size and content of the preview image 402 may remain unchanged, and the preview image 402 may be moved downward as the finger 403 of the user drags the preview image 402 down, as shown in FIG. 4I. In addition, when the gesture 405 is in progress, the graphical user interface of the weather app that is displayed on the touchscreen 101 may also scroll upward accordingly. In this way, updated weather information that is not displayed previously is displayed on the touchscreen 101. For example, the weather information 409 is currently displayed, as shown in FIG. 4I. After the finger of the user is lifted and leaves the touchscreen 101, the operation indicates that the user has ended the gesture 405. Therefore, in response to the lifting operation, the preview image 402 on the touchscreen 101 may be moved to an original position by using an upward pop-back animation effect, as shown in FIG. 4J. The position may be a position in which the preview image 402 is located when the finger 403 of the user does not touch the preview image 402, for example, a position in which the preview image 402 is located in FIG. 4C. In some other embodiments, after the preview image 402 pops back to the original position, the preview image 402 may be automatically updated to the preview image 410 or 411. In other words, a position of the preview image 410 may be the same as the position of the preview image 402.

It should be noted that, in this embodiment, the selection operation and the gesture 405 may be operations continuously performed by the user. For example, the user first performs the heavy press selection operation or the touch and hold selection operation, and then performs the downward swipe gesture 405 when the finger 403 does not leave the touchscreen 101.

In some other embodiments, as shown in FIG. 4C, after detecting a selection (for example, heavy press or touch and hold) operation performed by the user on the preview image 402, the electronic device 100 may display a GUI in FIG. 4G in response to the selection operation. In the GUI, the preview image is displayed with a floating effect, and controls 405 to 408 are displayed. When the user makes a leftward/rightward/upward/downward swipe gesture on the preview image 402 (or 410, 411, 413, or the like), in response to the gesture, the electronic device 100 may perform different processing on the screenshot corresponding to the preview image.

It should be noted that FIG. 3A to FIG. 3G, FIG. 4A to FIG. 4J, and the like are schematic diagrams used to explain and describe the technical solutions in the foregoing related embodiments, and numbers and arrangement sequences of the diagrams cannot indicate operation sequences of a series of graphical user interfaces in the embodiments. The numbers and arrangement sequences of the foregoing accompanying drawings may also be in another form.

Figure 5:
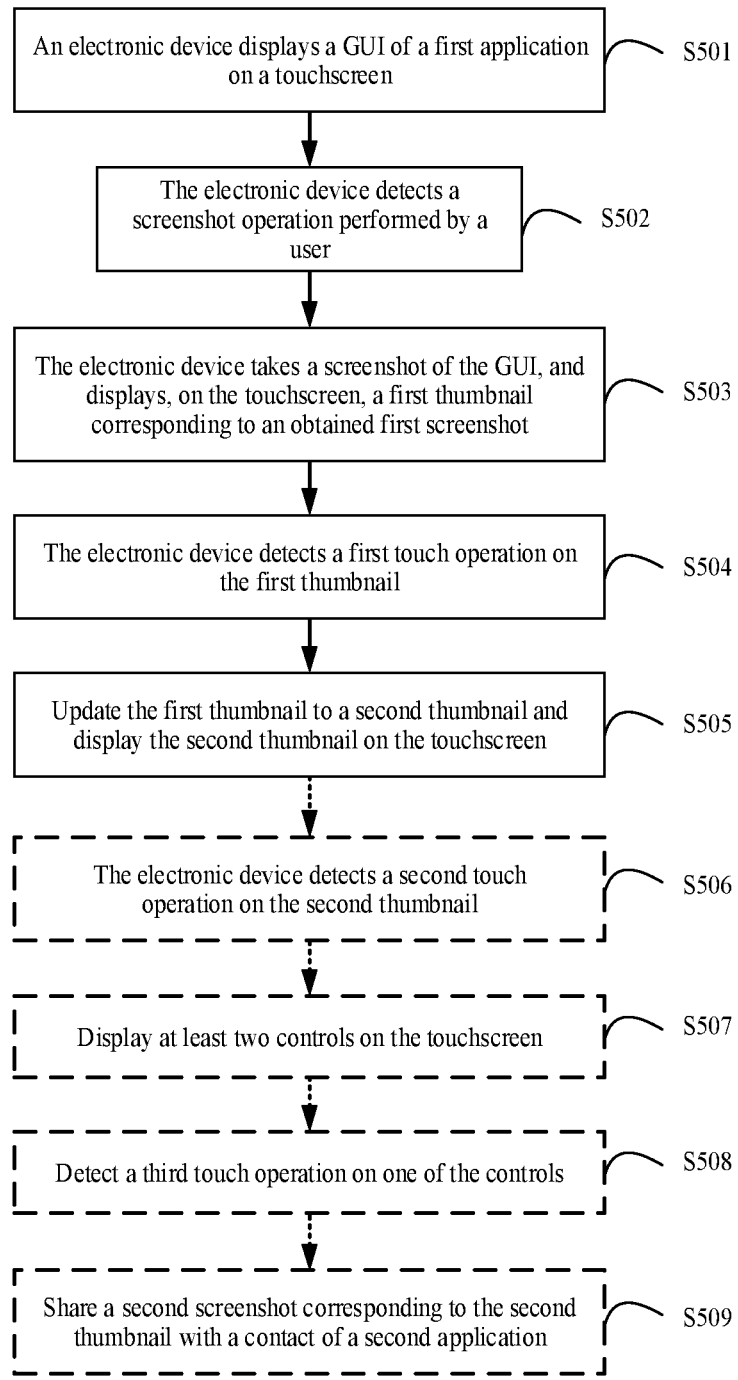
FIG. 5 is a schematic flowchart of a scrolling screenshot method according to some other embodiments.

With reference to the foregoing embodiments and the corresponding accompanying drawings, an embodiment provides a scrolling screenshot method. The method may be implemented on the electronic device 100 (for example, a mobile phone or a tablet computer) having the structure shown in FIG. 1. As shown in FIG. 5, the method may include the following steps.

Step S501: The electronic device displays a GUI of a first application on a touchscreen. The first app may be the weather application in the foregoing embodiment, and the GUI of the first app may be shown in FIG. 3A, FIG. 3B, FIG. 4A, or FIG. 4B.

Step S502: The electronic device detects a screenshot operation performed by a user. For example, as shown in FIG. 2A, the screenshot operation may be that the user simultaneously presses the power button 206 and the home button 204. Alternatively, the screenshot operation may be that the user taps a control on the touchscreen 101, and this is more quick and convenient. For another example, the screenshot operation may be based on a gesture made by the user on the touchscreen 101. When the electronic device 100 determines that the gesture is a preset gesture, the electronic device determines that the user is performing the screenshot operation. How to perform the screenshot operation is not limited in this embodiment.

Step S503: The electronic device takes a screenshot of the GUI in response to the screenshot operation, and displays, on the touchscreen, a first preview image corresponding to an obtained first screenshot. The first preview image may be the preview image 402 shown in FIG. 4C.

Step S504: The electronic device detects a first touch operation on the first preview image.

In some embodiments, the first touch operation may be a downward swipe gesture made by a finger of the user on the first preview image. In some other embodiments, the first touch operation may alternatively be as follows: A finger of the user performs a touch and hold selection operation or a heavy press selection operation on the first preview image, and then performs a downward swipe gesture without leaving the touchscreen. For example, as shown in FIG. 4C, the first touch operation may be that the finger 403 of the user performs a heavy press selection operation on the preview image 402, and then makes the downward swipe gesture 405 without leaving the touchscreen 101.

Step S505: Update the first preview image to a second preview image in response to the first touch operation, and display the second preview image on the touchscreen.

For example, when the electronic device detects the selection operation, if the electronic device receives a swipe gesture (for example, the downward swipe gesture 405) made by the user on the preview image 402, the electronic device starts to take a scrolling screenshot in response to the swipe gesture. As described in the foregoing embodiment, the electronic device may accordingly capture screenshots of different content based on a swipe distance of the swipe gesture (for example, the gesture 405) on the touchscreen, and may dynamically display preview images of the different screenshots on the touchscreen. For example, the first preview image is a preview image corresponding to the first screenshot captured based on the screenshot operation performed by the user, and the second preview image is a preview image of a second screenshot captured based on the first touch operation.

In some embodiments, the first touch operation may be a downward swipe gesture. In this case, the electronic device may capture, based on a swipe distance of the gesture, a screenshot including different content, and display, on the touchscreen, the second preview image corresponding to the screenshot. That is, the first preview image is updated to the second preview image for display.

In some embodiments, both the first preview image and the second preview image may correspond to the first application. In other words, the two preview images are different preview images that are displayed and that are obtained by taking screenshots of the first application.

According to the technical solution in the foregoing embodiment, the electronic device may enable the user to take a scrolling screenshot by using a touch operation such as a swipe gesture on a preview image. This greatly improves scrolling screenshot efficiency of the electronic device, and also improves user experience.

In some other embodiments, the first preview image may be automatically updated to the second preview image based on a distance of the touch operation such as the swipe gesture in step S504, and the second preview image is displayed on the touchscreen. In some other embodiments, when the first preview image is automatically updated to the second preview image, the GUI of the first application is automatically updated and displayed.

In some embodiments, the first screenshot corresponding to the first preview image is a screenshot of the currently displayed GUI, and the second screenshot corresponding to the second preview image not only includes the screenshot of the currently displayed GUI, but also includes a screenshot of content that is of the first application (for example, a weather application) and that is not displayed on the current GUI. Therefore, in terms of a display effect, a size of the first preview image may be less than a size of the second preview image. In this way, the user can easily identify whether a currently displayed preview image is a common screenshot or a scrolling screenshot. Certainly, in some other embodiments, although content of the first preview image is less than content of the second preview image, for uniform display effects, a size of the first preview image may alternatively be the same as a size of the second preview image.

In some other embodiments, the scrolling screenshot method may further include the following steps.

Step S506: The electronic device detects a second touch operation on the second preview image, where the second touch operation may be a touch and hold operation or a heavy press operation.

Step S507: Display at least two controls on the touchscreen in response to the second touch operation, where the controls are used to perform different processing on the second screenshot corresponding to the second preview image.

For example, these controls may be the controls 405 to 408 in FIG. 4G. In FIG. 4G, when detecting a touch operation performed by the user on the control 414, the electronic device 100 deletes the screenshot in response to the touch operation. When detecting a touch operation performed by the user on the control 406, the electronic device 100 saves the screenshot in response to the operation. When detecting a touch operation performed by the user on the control 407, the electronic device 100 shares the screenshot with a WeChat contact in response to the operation. When detecting a touch operation performed by the user on the control 408, in response to the operation, the electronic device 100 takes a scrolling screenshot of the weather app displayed on the touchscreen 101. In this way, the user can perform different operations on the second screenshot based on different controls, to improve screenshot processing efficiency of the electronic device, and further improve user experience.

Step S508: The electronic device detects a third touch operation on one of the controls.

Step S509: Share the second screenshot corresponding to the second preview image with a contact of a second application in response to the third touch operation.

For example, the control may be the control 407 in FIG. 4G, and the control 407 is used to share the second screenshot corresponding to the preview image with a WeChat contact.

In some other embodiments, as shown in FIG. 4G, when detecting a leftward swipe gesture made by the user on the preview image 410, the electronic device 100 deletes the screenshot in response to the gesture. When detecting a rightward swipe gesture made by the user on the preview image 410, the electronic device 100 saves the screenshot in response to the gesture. When detecting an upward swipe gesture made by the user on the preview image 410, the electronic device 100 shares the screenshot with a WeChat contact in response to the gesture. When detecting a downward swipe gesture made by the user on the preview image 410, in response to the operation, the electronic device 100 takes a scrolling screenshot of the weather app displayed on the touchscreen 101. In this way, the user can perform different operations on the screenshot based on different gestures, to improve screenshot processing efficiency of the electronic device.

It may be understood that the gesture in the foregoing embodiment, for example, the gesture 304, 307, 405, or 415, may be a swipe gesture on (or for) any position on the touchscreen 101, or may be a swipe gesture on a preview image (for example, the preview image 302) of a screenshot. In the latter case, only a swipe gesture (for example, the gesture 304 or 307) on the preview image 302 can trigger display of the function menu 305 or the function menu 305 on the touchscreen 101. In some embodiments, the swipe gesture on (or for) the preview image 302 may be specifically as follows: The finger 303 of the user touches the displayed preview image 302, and then makes an upward slide gesture or a downward slide gesture without leaving the touchscreen 101. In some other embodiments, the gesture on the preview image 302 may alternatively be as follows: The finger 303 of the user heavily presses the preview image 302, and then makes an upward swipe gesture or a downward swipe gesture without leaving the touchscreen 101. Certainly, the foregoing merely describes an example of a gesture on the preview image 302. In some other embodiments, the gesture may alternatively be another type of gesture. The gesture is not limited in this embodiment.

Figure 7:
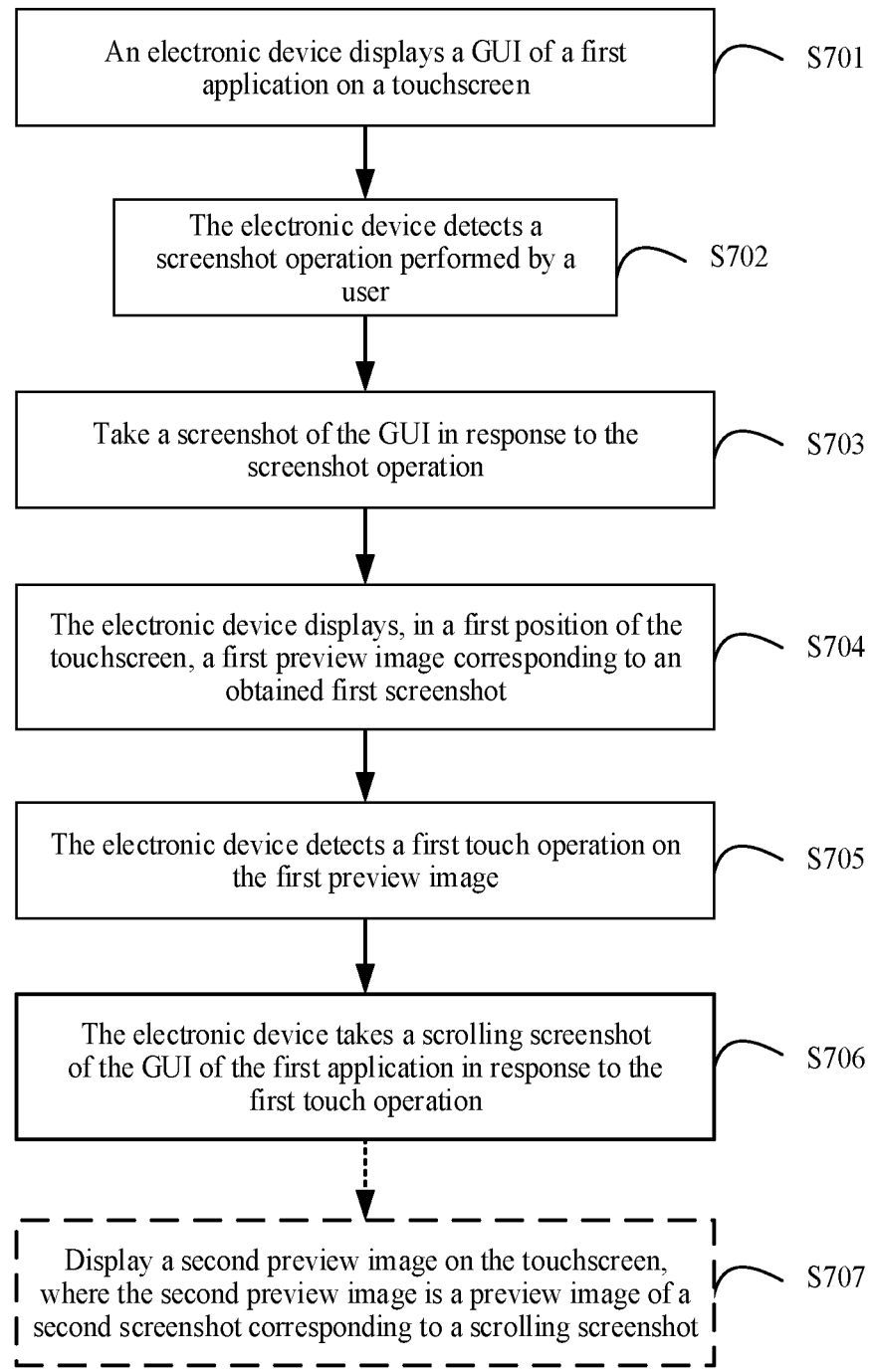
FIG. 7 is a schematic flowchart of a scrolling screenshot method according to some other embodiments.

As shown in FIG. 7, an embodiment provides a scrolling screenshot method. The method may be implemented on an electronic device 100 having a touchscreen, and includes the following steps.

Step S701: Display a graphical user interface (GUI) of a first application on the touchscreen.

Step S702: The electronic device detects a screenshot operation.

Step S703: The electronic device takes a screenshot of the GUI in response to the screenshot operation.

Step S704: The electronic device displays, in a first position of the touchscreen, a first preview image corresponding to an obtained first screenshot.

Step S705: The electronic device detects a first touch operation on the first preview image.

Step S706: The electronic device takes a scrolling screenshot of the GUI of the first application in response to the first touch operation.

According to the technical solution in the foregoing embodiment, a gesture operation is performed on the first preview image, so that a scrolling screenshot can be taken very conveniently. In this way, efficiency of the electronic device is improved, and user experience is also improved.

In some other embodiments, the foregoing method may further include the following step:

Step S707: Display a second preview image on the touchscreen, where the second preview image is a preview image of a second screenshot corresponding to a scrolling screenshot.

In some other embodiments, the first touch operation may be a downward swipe gesture on the first preview image.

In this case, that the electronic device takes a scrolling screenshot of the GUI of the first application in response to the first touch operation may specifically include: automatically updating, by the electronic device, the displayed GUI of the first application on the touchscreen based on a swipe distance of the gesture.

In some embodiments, the first preview image may be accordingly moved downward with swiping of the gesture with an unchanged size. In some other embodiments, the first preview image may be accordingly moved downward with swiping of the gesture, and the first preview image is automatically updated based on the swipe distance of the gesture.

In some embodiments, when the gesture stops, the first preview image pops back and is displayed in the first position. In some other embodiments, when the gesture stops, the first preview image pops back and is displayed in the first position, and the first preview image is automatically updated to the second preview image. The second preview image is a preview image of the second screenshot captured based on the swipe distance of the gesture.

Figure 6:
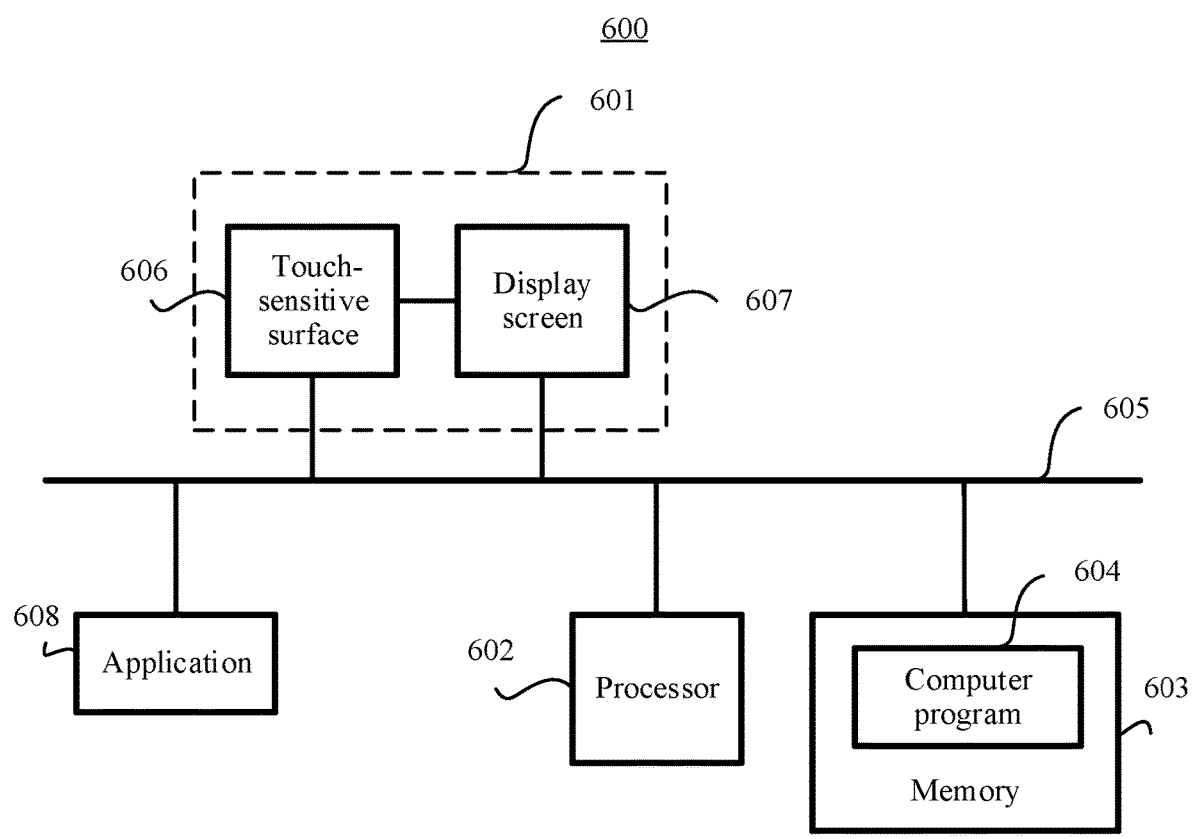
FIG. 6 is a schematic structural diagram of an electronic device 600 according to some other embodiments.

As shown in FIG. 6, some other embodiments of this application disclose an electronic device 600. The electronic device 600 may include a touchscreen 601, one or more processors 602, a memory 603, a plurality of applications 608, and one or more computer programs 604. The touchscreen 601 includes a touch-sensitive surface 606 and a display 607. The foregoing components may be connected through one or more communications buses 605. The one or more computer programs 804 are stored in the memory 603 and are configured to be executed by the one or more processors 602. The one or more computer programs 604 include an instruction, and the instruction may be used to perform the steps in the corresponding embodiment in FIG. 5. In some other embodiments, the instruction may be used to perform the steps in the corresponding embodiment in FIG. 7.

According to the foregoing descriptions of the implementations, a person skilled in the art may clearly understand that, for the purpose of convenient and brief description, division into the foregoing function modules is only used as an example for description. In actual application, the foregoing functions may be allocated to different function modules and implemented based on a requirement. In other words, an inner structure of an apparatus is divided into different function modules, to implement all or some of the functions described above. For a detailed working process of the foregoing system, apparatus, and unit, refer to a corresponding process in the foregoing method embodiments, and details are not described herein again.

Function units in the embodiments of this application may be integrated into one processing unit, or each of the units may independently exist physically, or two or more units are integrated into one unit. The integrated unit may be implemented in the form of hardware or may be implemented in the form of a software function unit.

It should be noted that, in the foregoing embodiments, a screenshot may include a status bar, or may not include a status bar. The screenshot may include an entire GUI of an app, or may include only a part of GUI of the app. In the latter case, the screenshot may also be referred to as a screenshot of the app.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented through software, hardware, firmware, or any combination thereof. When software is used to implement the embodiments, the embodiments may be implemented completely or partially in the form of a computer program product. The computer program product includes one or more computer instructions. When the computer program instructions are loaded and executed on a computer, the procedures or the functions according to the embodiments of this application are all or partially generated. The computer may be a general-purpose computer, a dedicated computer, a computer network, or other programmable apparatuses. The computer instructions may be stored in the computer readable storage medium or may be transmitted from a computer readable storage medium to another computer readable storage medium. For example, the computer instructions may be transmitted from a web site, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

For a purpose of explanation, the foregoing descriptions are provided with reference to the specific embodiments. However, the foregoing example discussions are not intended to be detailed, and are not intended to limit this application to a disclosed precise form. According to the foregoing teaching content, many modification forms and variation forms are possible. The embodiments are selected and described to fully illustrate the principles of this application and practical application of the principles, so that other persons skilled in the art can use this application and the various embodiments that have various modifications applicable to conceived specific usage.

What is claimed is:

1. A scrolling screenshot method implemented by an electronic device comprising a touchscreen, wherein the scrolling screenshot method comprises:
    displaying a graphical user interface (GUI) of a first application on the touchscreen;
    detecting a screenshot operation;
    taking, in response to the screenshot operation, a first screenshot of the GUI, wherein the first screenshot comprises first content;
    displaying, on the touchscreen, a first preview image corresponding to the first screenshot;
    detecting a first touch operation on the first preview image;
    displaying, in response to the first touch operation, a first interface for editing the first screenshot;
    displaying a first control proximate to the first preview image;
    detecting a second touch operation on the first control;
    taking, in response to the second touch operation, a scrolling screenshot of the GUI; and
    displaying, on the touchscreen, a second preview image corresponding to the scrolling screenshot,
    wherein the scrolling screenshot comprises second content,
    wherein the second content comprises a top part of the first content and additional content, and
    wherein the additional content is not comprised in the first content.

2. The scrolling screenshot method of claim 1, wherein a second area occupied by the second preview image on the touchscreen is larger than a first area occupied by the first preview image on the touchscreen.

3. The scrolling screenshot method of claim 1, wherein the first preview image comprises a first length, wherein the second preview image comprises a second length, and wherein the second length is longer than the first length.

4. The scrolling screenshot method of claim 3, wherein the first preview image is a first thumbnail image of the first screenshot, and wherein the second preview image is a second thumbnail image of the scrolling screenshot.

5. The scrolling screenshot method of claim 1, wherein the second preview image is a thumbnail image of the scrolling screenshot.

6. The scrolling screenshot method of claim 1, further comprising:
    detecting a third touch operation on the second preview image; and
    displaying, in response to the third touch operation, a second interface for editing the scrolling screenshot.

7. The scrolling screenshot method of claim 1, further comprising:
    displaying a second control proximate to the first preview image;
    detecting a third touch operation on the second control; and
    sharing, in response to the third touch operation, the first screenshot with a contact of a second application.

8. The scrolling screenshot method of claim 1, wherein displaying the first control comprises displaying, in response to a third touch operation on the first preview image, the first control proximate to the first preview image.

9. The scrolling screenshot method of claim 1, wherein displaying the first control comprises displaying the first control proximate to the first preview image before detecting the first touch operation.

10. An electronic device comprising:
    a touchscreen; and
    a processor coupled to the touchscreen and configured to:
        display a graphical user interface (GUI) of a first application on the touchscreen;
        detect a screenshot operation;
        take, in response to the screenshot operation, a first screenshot of the GUI, wherein the first screenshot comprises first content;
        display, on the touchscreen, a first preview image corresponding to the first screenshot;
        detect a first touch operation on the first preview image;
        display, in response to the first touch operation, a first interface for editing the first screenshot;
        display a first control proximate to the first preview image;
        detect a second touch operation on the first control;
        take, in response to the second touch operation, a scrolling screenshot of the GUI; and
        display, on the touchscreen, a second preview image corresponding to the scrolling screenshot,
        wherein the scrolling screenshot comprises second content,
        wherein the second content comprises a top part of the first content and additional content, and
        wherein the additional content is not comprised in the first content.

11. The electronic device of claim 10, wherein a second area occupied by the second preview image on the touchscreen is larger than a first area occupied by the first preview image on the touchscreen.

12. The electronic device of claim 10, wherein the processor is further configured to:
    detect a third touch operation on the second preview image; and
    display, in response to the third touch operation, a second interface for editing the scrolling screenshot.

13. The electronic device of claim 10, wherein the processor is further configured to:
    display a second control proximate to the first preview image;
    detect a third touch operation on the second control; and
    share, in response to the third touch operation, the first screenshot with a contact of a second application.

14. The electronic device of claim 10, wherein the processor is configured to display the first control by displaying, in response to a third touch operation on the first preview image, the first control proximate to the first preview image.

15. The electronic device of claim 10, wherein the first preview image comprises a first length, wherein the second preview image comprises a second length, and wherein the second length is longer than the first length.

16. The electronic device of claim 15, wherein the first preview image is a first thumbnail image of the first screenshot, and wherein the second preview image is a second thumbnail image of the scrolling screenshot.

17. The electronic device of claim 10, wherein the second preview image is a thumbnail image of the second screenshot.

18. The electronic device of claim 10, wherein the processor is configured to display the first control by displaying the first control proximate to the first preview image before detecting the first touch operation.

19. An electronic device comprising:
a touchscreen; and
a processor coupled to the touchscreen and configured to:
  display a graphical user interface (GUI) of a first application on the touchscreen;
  detect a screenshot operation;
  take, in response to the screenshot operation, a first screenshot of the GUI, wherein the first screenshot comprises first content;
  display, on the touchscreen, a first preview image corresponding to the first screenshot;
  detect a first touch operation on the first preview image;
  display, in response to the first touch operation, an interface for editing the first screenshot;
  display a first control proximate to the first preview image;
  detect a second touch operation on the first control; and
  take, in response to the second touch operation, a second screenshot of the GUI,
  wherein the second screenshot comprises second content,
  wherein the second content comprises a top part of the first content and additional content, and
  wherein the additional content is not comprised in the first content.

20. The electronic device of claim 19, wherein the processor is further configured to display a second preview image on the touchscreen, and wherein the second preview image comprises the second screenshot.

\* \* \* \* \*